(12) United States Patent
Osborn et al.

(10) Patent No.: US 12,147,984 B2
(45) Date of Patent: Nov. 19, 2024

(54) SYSTEMS AND METHODS FOR EVALUATING LEGITIMACY OF INTERACTIONS TO REDUCE FRAUD

(71) Applicant: Capital One Services, LLC, McLean, VA (US)

(72) Inventors: Kevin Osborn, Newton Highlands, MA (US); David Kelly Wurmfeld, Palm Bay, FL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/658,113

(22) Filed: Apr. 6, 2022

(65) Prior Publication Data

US 2023/0325839 A1    Oct. 12, 2023

(51) Int. Cl.
*G06Q 20/40*    (2012.01)
(52) U.S. Cl.
CPC .................. *G06Q 20/4016* (2013.01)
(58) Field of Classification Search
CPC .............. G06Q 20/4016; G06Q 20/3223
See application file for complete search history.

(56) References Cited

U.S. PATENT DOCUMENTS

| | | | | |
|---|---|---|---|---|
| 6,311,165 B1 * | 10/2001 | Coutts | ................ | G06Q 20/1085 710/1 |
| 9,779,392 B1 * | 10/2017 | Prasad | ................ | G06Q 20/0425 |
| 10,134,024 B2 | 11/2018 | Smith et al. | | |
| 10,245,875 B1 | 4/2019 | Nagelberg et al. | | |
| 10,672,009 B2 | 6/2020 | Kelly et al. | | |

(Continued)

FOREIGN PATENT DOCUMENTS

| | | | | |
|---|---|---|---|---|
| CA | 2704864 A1 | * | 8/2010 | ............. G06Q 20/32 |
| WO | WO-2017105297 A2 | * | 6/2017 | ........... G06Q 20/042 |

OTHER PUBLICATIONS

"Anonymous et al. Method by which two dimensional barcodes can be used to transmit transaction data in lieu of MICR characters, May 25, 2012, IP.com Prior Art Database Technical Disclosure, entire document" (Year: 2012).*

(Continued)

*Primary Examiner* — Abhishek Vyas
*Assistant Examiner* — Adam Hilmantel
(74) *Attorney, Agent, or Firm* — Bookoff McAndrews, PLLC

(57) ABSTRACT

Disclosed are methods and systems for determining legitimacy of interactions. For instance, a request for an instrument to complete an interaction may be received from an account holder computing device, information associated with the request may be stored within a data storage entry, and a code including a uniform resource locator to a web application may be printed on the instrument. Subsequent to a printing of the instrument that includes the code, an access to the web application by a computing device of a recipient or an entity associated with the recipient of the instrument may be detected in response to the computing device reading the code. A legitimacy of the interaction may be determined by evaluating a plurality of interaction legitimacy factors based, at least in part, on the data storage entry, and an indication of the determined legitimacy may be provided for display via the web application.

20 Claims, 7 Drawing Sheets

(56) References Cited

U.S. PATENT DOCUMENTS

| | | | |
|---|---|---|---|
| 10,960,684 B1 | 3/2021 | Wurmfeld et al. | |
| 11,100,476 B1 | 8/2021 | Yan | |
| 11,222,326 B1 | 1/2022 | Wurmfeld | |
| 2006/0282383 A1 | 12/2006 | Doran | |
| 2007/0050291 A1* | 3/2007 | Avazian | G06Q 20/04 705/40 |
| 2010/0006643 A1 | 1/2010 | Epstein | |
| 2012/0187185 A1 | 7/2012 | Sayan | |
| 2012/0321783 A1 | 12/2012 | Hampden-Smith et al. | |
| 2012/0325904 A1 | 12/2012 | Harbin | |
| 2013/0066777 A1 | 3/2013 | Richards | |
| 2013/0247218 A1 | 9/2013 | Jhingan et al. | |
| 2014/0310174 A1* | 10/2014 | Heeter | G06Q 20/40 455/411 |
| 2015/0213421 A1 | 7/2015 | Block et al. | |
| 2016/0227066 A1 | 8/2016 | Shimazaki | |
| 2016/0255243 A1 | 9/2016 | Omori et al. | |
| 2017/0185972 A1 | 6/2017 | Bozeman | |
| 2018/0197031 A1 | 7/2018 | Kurian et al. | |
| 2019/0139021 A1* | 5/2019 | Madeira Da Silva | G06Q 20/3224 |
| 2019/0164161 A1 | 5/2019 | Sultan et al. | |
| 2019/0333016 A1 | 10/2019 | Phillips et al. | |
| 2020/0167106 A1 | 5/2020 | Kim et al. | |
| 2020/0380493 A1* | 12/2020 | Morales | G06F 21/43 |
| 2021/0178778 A1 | 6/2021 | Wurmfeld et al. | |
| 2022/0067674 A1* | 3/2022 | Yan | G06Q 20/042 |
| 2022/0101281 A1 | 3/2022 | Lechimanan | |
| 2022/0172583 A1 | 6/2022 | Waldron et al. | |
| 2022/0253839 A1* | 8/2022 | Kolchin | G06Q 20/108 |
| 2022/0414642 A1* | 12/2022 | Wurmfeld | G06Q 20/325 |
| 2023/0352938 A1 | 11/2023 | Moreno et al. | |

OTHER PUBLICATIONS

QR Codes for Cheques | QR Codes for Reducing Cheque Fraud, Qryptal, no date but published before Mar. 7, 2022, https://www.qryptal.com/industries/cheques/ [retrieved on Mar. 7, 2022]. Retrieved from the Internet (6 pages).

* cited by examiner

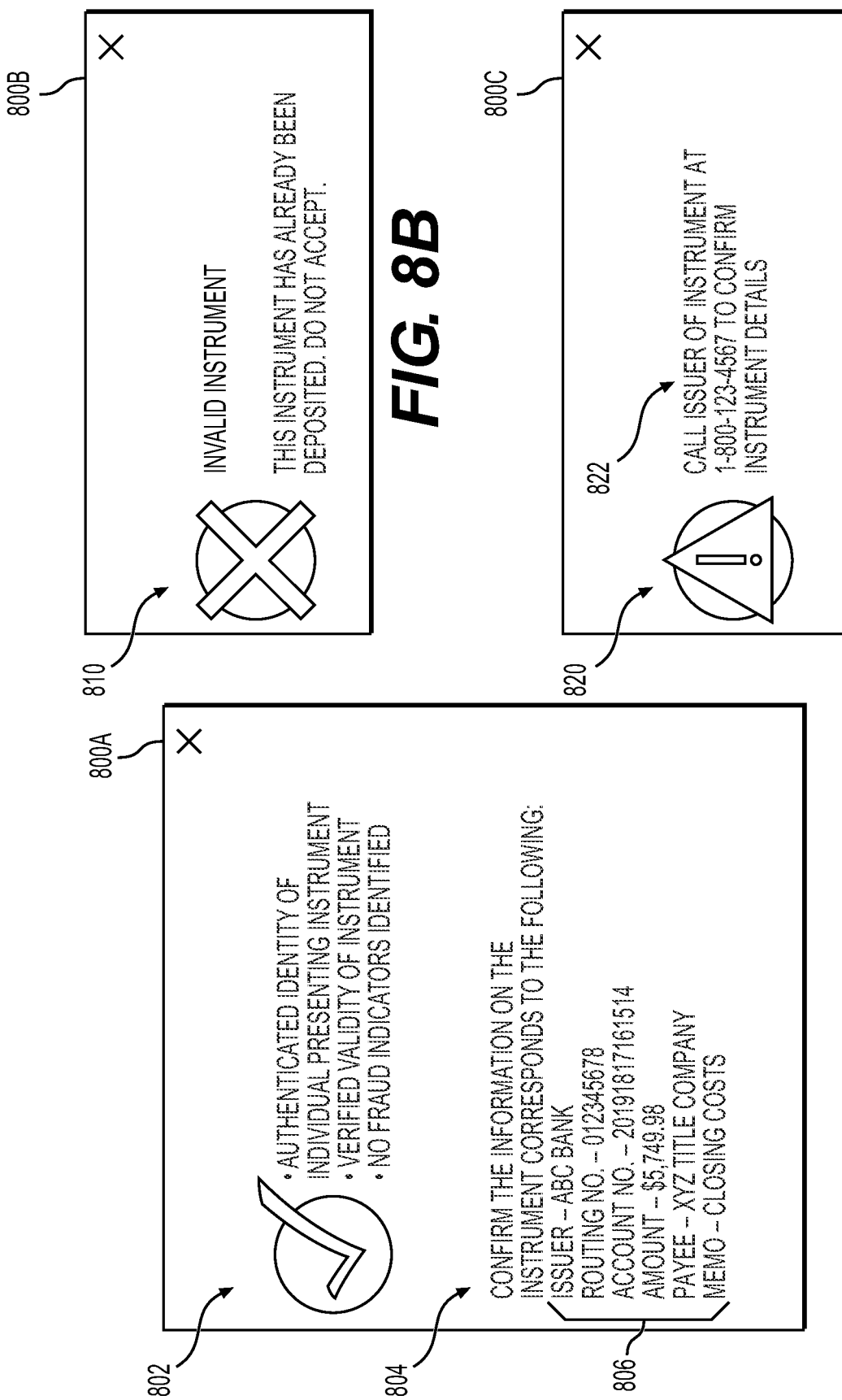

SYSTEMS AND METHODS FOR EVALUATING LEGITIMACY OF INTERACTIONS TO REDUCE FRAUD

TECHNICAL FIELD

Various embodiments of this disclosure relate generally to techniques for monitoring interactions involving instruments to reduce fraud, and, more particularly, to systems and methods for validating an instrument and/or determining a legitimacy of an interaction involving the instrument.

BACKGROUND

Conventionally, to obtain an instrument such as a cashier's check, a customer may visit a physical location of a financial institution and interact with a teller. The customer may provide the teller identifying information, such as the customer's account from which funds for the cashier's check are to be drawn. The teller may verify the account has sufficient funds to cover the amount of the cashier's check, and if so, may cause generation and printing of the instrument, e.g., via a financial institution computing device. The amount of the cashier's check is immediately transferred from the customer's account to a holding account of the financial institution upon the generation of the instrument. Resultantly, if it is subsequently determined that the information printed on the cashier's check is erroneous or if the cashier's check is lost or stolen, a burdensome process must be undertaken by the customer to void or cancel the cashier's check and request issuance of a new cashier's check. For example, the customer may be required to mail the cashier's check to a processing location of the financial institution that may then take days, weeks, or even months to reverse the previous transaction (e.g., to move the amount of the cashier's check from the holding account back to the customer's account). The financial institution may also require separate fees for this process.

Additionally, cashier's checks, among other instruments, are often a financial vehicle of choice for fraudulent interactions, including money laundering and/or funding of terrorist organizations. For example, duplicate cashier's checks may be fraudulently generated when customers' and/or tellers' pocket an initial cashier's check and/or funds drawn to cover a cashier's check may be obtained by ill-begotten means or are being used for illegal activity. It may be difficult for a recipient of the cashier's check and/or a financial institution of the recipient that is depositing the cashier's check to know from the cashier's check alone whether the cashier's check is valid and whether the interaction may be fraudulent.

The above-referenced challenges surrounding cashier's checks may be further exacerbated as financial institutions begin offering instrument generation services online and/or via self-service devices, such as kiosks.

This disclosure is directed to addressing the above-referenced challenges, among other challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for monitoring interactions involving instruments to reduce fraud. For example, in addition to methods and systems for enabling validation of an instrument, the methods and systems disclosed herein may enable determination of a legitimacy of an interaction involving the instrument.

For instance, a computer-implemented method may include receiving, from a first computing device of an account holder, a request for an instrument to complete an interaction, storing information associated with the request within a data storage entry for the instrument, and generating a code to be printed on the instrument, the code including a uniform resource locator (URL) to a web application. The method may also include, subsequent to a printing of the instrument that includes the code, detecting an access to the web application by a second computing device of one of a recipient or an entity associated with the recipient of the instrument in response to the second computing device reading the code, and determining a legitimacy of the interaction by evaluating a plurality of interaction legitimacy factors based, at least in part, on the data storage entry for the instrument. At least a first subset of the plurality of interaction legitimacy factors may be associated with an identity authenticity of an individual presenting the instrument to the one of the recipient or the entity associated with the recipient. At least a second subset of the plurality of interaction legitimacy factors may be associated with a validity of the instrument. The method may further include providing an indication of the determined legitimacy of the interaction for display on a user interface of the web application.

A system may include at least one memory storing instructions, and at least one processor operatively connected to the at least one memory and configured to execute the instructions to perform operations. The operations may include receiving, from a first computing device of an account holder, a request for an instrument to complete an interaction, storing information associated with the request within a data storage entry for the instrument; and generating a code to be printed on the instrument, the code including a uniform resource locator (URL) to a web application. The operations may also include, subsequent to a printing of the instrument that includes the code, detecting an access to the web application by a second computing device of one of a recipient or an entity associated with the recipient of the instrument in response to the second computing device reading the code, and determining a legitimacy of the interaction by evaluating a plurality of interaction legitimacy factors based, at least in part, on the data storage entry for the instrument. At least a first subset of the plurality of interaction legitimacy factors may be associated with an identity authenticity of an individual presenting the instrument to the one of the recipient or the entity associated with the recipient. At least a second subset of the plurality of interaction legitimacy factors may be associated with a validity of the instrument. The operations may further include providing an indication of the determined legitimacy of the interaction for display on a user interface of the web application.

A computer-implemented method may include receiving, from a first computing device of an account holder, a request for an instrument to complete an interaction, storing information associated with the request within a data storage entry for the instrument, assigning an authentication identifier to the instrument, providing the assigned authentication identifier to the first computing device, and storing information associated with the request, including the assigned authentication identifier, within a data storage entry for the instrument. The method may also include, subsequent to a printing of the instrument that includes the code, detecting an access to the web application by a second computing device of one of a recipient or an entity associated with the recipient of the instrument in response to the second computing device reading the code, providing, for display on a user interface of the web application, a prompt to request the assigned authentication identifier for input via the second computing device, receiving an input from the second computing device responsive to the prompt, and determining a legitimacy of the interaction by evaluating a plurality of interaction legitimacy factors based, at least in part, on the data storage entry for the instrument. At least a first subset of the plurality of interaction legitimacy factors may be associated with an identity authenticity of an individual presenting the instrument to the one of the recipient or the entity associated with the recipient, where the identity authenticity is based, at least in part, on a comparison of the assigned authentication identifier and the input received from the second computing device. At least a second subset of the plurality of interaction legitimacy factors may be associated with a validity of the instrument. The method may further include providing an indication of the determined legitimacy of the interaction for display on a user interface of the web application.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 8A-8C depict exemplary application user interfaces displaying an indication of a determined legitimacy of an interaction involving an instrument.

DETAILED DESCRIPTION OF EMBODIMENTS

Figure 1:
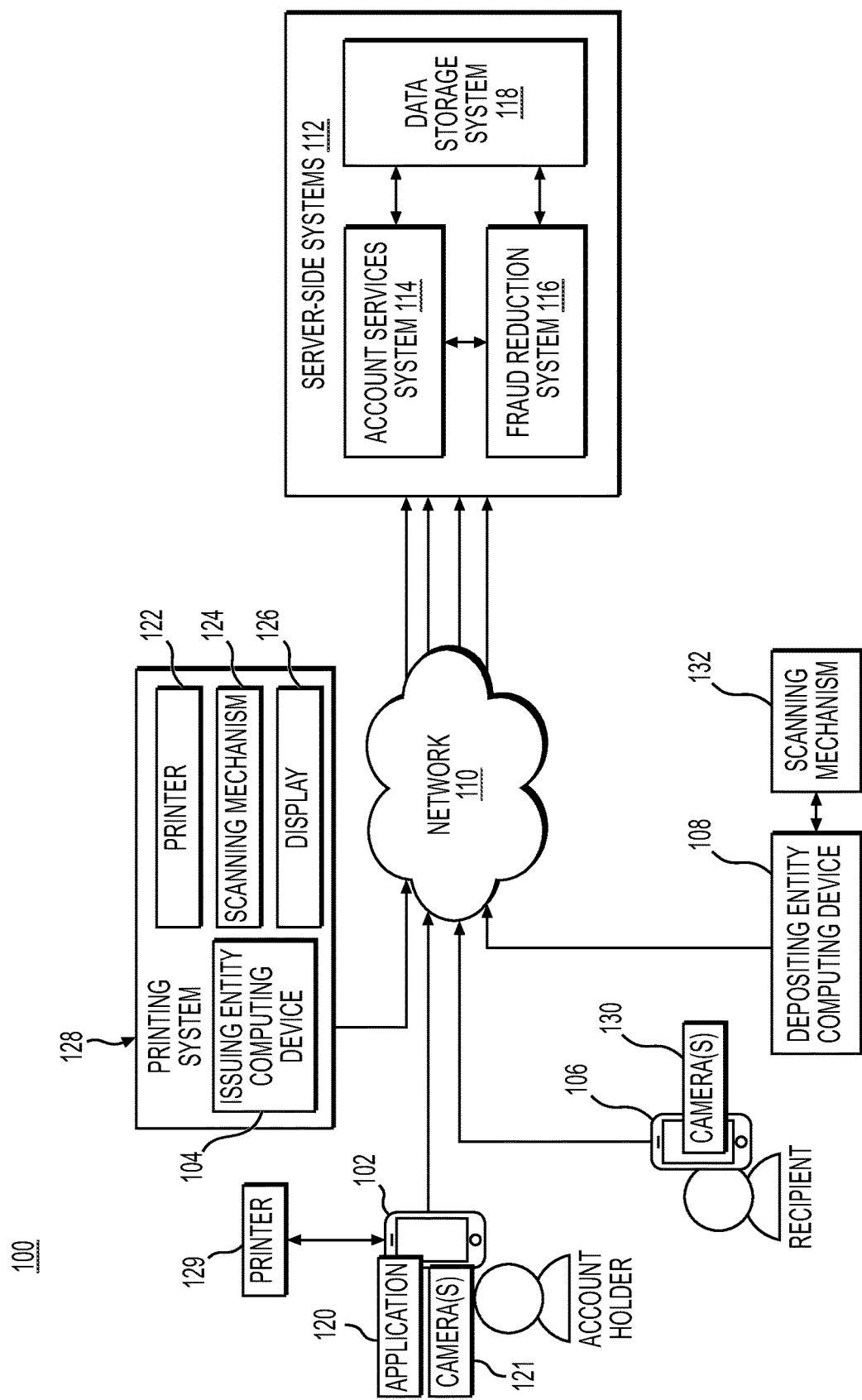
FIG. 1 depicts an exemplary environment for monitoring an interaction involving an instrument, according to certain embodiments.

According to certain aspects of the disclosure, methods and systems are disclosed for monitoring an interaction involving an instrument. As will be discussed in more detail below, in various embodiments, systems and methods are described for validating the instrument and/or determining a legitimacy of the interaction utilizing a code printed on the instrument. For example, a reading of the code printed on the instrument may be leveraged by an account holder who requested the instrument to validate (e.g., make active or alive) the printed instrument. Additionally or alternatively, a reading of the code printed on the instrument may be leveraged by a recipient of the instrument and/or an entity associated with the recipient (e.g., a depositing entity) to trigger a determination of the legitimacy of the interaction.

Reference to any particular activity is provided in this disclosure only for convenience and is not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Similarly, the term "or" is intended to mean "and/or," unless explicitly stated otherwise. Relative terms, such as, "substantially" and "generally," are used to indicate a possible variation of ±10% of a stated or understood value.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. In some embodiments disclosed herein, the provider is an account provider, such as a financial institution providing financial account services to account holders. In such embodiments, the item may be an instrument issued by the provider on behalf of the account holder. As used herein, terms like "instrument" generally encompass any document promising or guaranteeing the payment of a specific amount of money to a given individual or entity (e.g., a recipient) by an issuer of the document. Example instruments may include but are not limited to a cashier's check, a personal check, a traveler's check, or money orders. Additionally, at least a portion of the financial account services provided by the account provider, including instrument generation services, may be provided to account holders online via an application associated with the financial institution. The term "application" may be used interchangeably with other terms like "program," or the like, and generally encompasses software that is configured to interact with, modify, override, supplement, or operate in conjunction with other software. In some examples, the application may be a local application installed on a computing device. In other examples, the application may be a web application launched in a web browser, e.g., on the computing device.

As used herein, terms like "account holder" generally encompass any person or entity that may have an account and consume account services from an account provider, including online account services through an application associated with the account provider, for example. For purposes of this disclosure, the account holder may also be the requester of an instrument, e.g., via the application. In such instances, the account holder may also be referred to herein as a drawer because funds for the instrument are deducted from the account of the account holder. As used herein, terms like "recipient" or "payee" generally encompass any person or entity that receives the funds of the instrument upon accepting the instrument from the account holder and subsequently depositing or otherwise collecting payment on the instrument with a depositing entity. As used herein, terms like "entity associated with the recipient" or "depositing entity" generally encompass any entity that is capable of providing the recipient with the funds for the instrument. For example, the entity may be able to deposit or otherwise provide payment on the instrument to the recipient. The entity may be a financial institution or other similar institution associated with the recipient. For example, the recipient may have an account with the institution.

As used herein, terms like "interaction" generally encompass any type of transaction involving an instrument between an account holder requesting the instrument and a recipient, where the instrument serves to complete the transaction. For example, certain types of transactions, and particularly transactions for high dollar value items (e.g., cars, housing, etc.) may require that a party to the transaction purchasing the items (e.g., the account holder) pay the recipient via an instrument that provides extra guarantees, such as a cashier's check that is guaranteed by the account provider.

As used herein, terms like "code" generally encompass any data representation that is printable onto an instrument and is machine-readable such that a computing device itself (e.g., via cameras of the computing device) and/or a scanner coupled to the computing device is able to read the data representation. An example code may include a quick response (QR) code or a bar code. However, the code need not be in a form or structure of a code, and may be any type of indicia printed onto the instrument that is machine-readable. The code may include private data (e.g., encrypted and/or digitally signed data), public data (e.g., a public URL), or a combination of private and public data.

As used herein, terms like "data storage entry" or "entry" generally encompass any form or structure corresponding to a data storage scheme for storing and/or updating stored data associated with an instrument. Example data storage schemes may include an immutable ledger, a linked list data structure, or a database.

In an exemplary use case, certain embodiments may be performed for monitoring an interaction involving an instrument. The monitoring may be enabled by a code generated for and printed on the instrument. In some embodiments, the instrument with the code may be generated and printed based on interactions between an application of a financial institution executing on an account holder computing device and a kiosk that each communicate with server-side system(s) of the financial institution to cause the generation and printing of the instrument by the kiosk, hereinafter referred to as kiosk embodiments. In other embodiments, the instrument with the code may be generated and printed based on interactions between the account holder and an employee, such as a teller, that is operating a financial institution computing device, hereinafter referred to as teller embodiments. For example, the teller may input instrument information into the financial institution computing device that is communicating with the server-side system(s) of the financial institution to cause the generation and printing of the instrument by a printer associated with the financial institution computing device. In further embodiments, the instrument with the code may be generated and printed, or at least the code may be generated and printed on an existing physical instrument, based on interactions between the application of the financial institution executing on the mobile computing device of the account holder, the server-side system(s) of the financial institution, and a printer communicatively coupled to the mobile computing device, hereinafter referred to as home printing embodiments.

As described with reference to FIGS. 2-4 below, the code printed on the instrument may be leveraged by the account holder to validate the instrument post-printing. For example, in any of the kiosk, teller, and/or home printing embodiments, when the instrument with the code is printed, the instrument may be invalid. The instrument may remain invalid until the code on the instrument is read, e.g. by a designated device, such as a scanning mechanism of a kiosk, a scanning mechanism associated with the financial institution computing device, and/or a camera of the account holder's computing device that is executing the application in the respective kiosk, teller, and/or home printing embodiments. In some examples, the validation of the instrument may be authenticated to verify that an individual facilitating the reading of the code, and thus the validation, is the account holder and/or is someone authorized by the account holder, such as the teller, to do so. This authentication may prevent a fraudulent interaction to be conducted with the instrument in scenarios where the true account holder never receives the instrument, e.g., because the instrument is retrieved from the kiosk by a bad actor when the account holder is distracted and/or is pocketed by the teller.

Additionally, in examples where the instrument is a cashier's check, the reading of the code by the designated device may trigger the automatic transfer of funds covering an amount of the cashier's check from the account of the account holder to a holding account of the financial institution (e.g., as opposed to generation of the instrument conventionally triggering the automatic transfer of funds). Many issues with cashier's check result from erroneous information printed on the cashier's check, such as an incorrect name of the payee or an incorrect amount. By holding off on the transfer of the funds until the code is read, the account holder may confirm that the information printed on the cashier's check is correct prior to facilitating the reading of the code. That way, if any information is incorrect, the account holder may simply not facilitate the reading of the code such that the original cashier's check continues to remain invalid, and proceed with requesting a new cashier's check with the correct information for the same interaction.

Further, once the instrument is validated, the account holder may also be enabled to transmit an invalidation request via the application. For example, if an error with the information printed on the instrument is later recognized (e.g., upon presentation to the recipient) or if the instrument is lost, stolen, or otherwise will no longer be used, the invalidation request may cause the instrument to be invalidated such that any subsequent attempts to deposit or otherwise collect payment on the instrument are denied. Additionally, if the circumstances warrant it, a new instrument (e.g., for the same transaction) may be requested.

Once the instrument has been generated and is in the possession of the account holder, several presentations of the instrument may occur to complete the interaction. For example, a first presentation may occur when an individual alleging to be the account holder who requested the instrument presents the instrument to the recipient. As the instrument is presented, it may be desirable for the recipient accepting the instrument to know on the spot whether this instrument is a valid instrument for which the recipient can collect payment on and/or whether the individual presenting the cashier's check is in fact the account holder. To provide an illustrative example, the instrument may be a cashier's check that is being presented from a potential tenant to a recipient landlord as a deposit to secure an apartment. Rather than blindly accepting and hoping the cashier's check is valid and depositable, it would be advantageous for the landlord to be able to receive a more immediate indication of the validity of the cashier's check (e.g., prior to accepting the check from the potential tenant).

A second presentation may occur when an individual alleging to be the recipient of the instrument, or an individual authorized to act on behalf of the recipient, presents the instrument to an entity associated with the recipient (e.g., a depositing entity) to deposit the instrument or otherwise collect payment. As the instrument is presented, it may be desirable for the entity depositing the instrument to know whether this instrument is a valid instrument that can be deposited, whether the individual presenting the cashier's check is in fact the recipient, and/or, even if the instrument is valid and the individual is in fact the recipient, whether the interaction as a whole has indications or characteristics of a fraudulent interaction (e.g., money laundering, terrorism financing, etc.). To provide an illustrative example, the instrument may be a cashier's check that is being presented from a recipient to a teller at the recipient's financial institution for deposit. To help reduce the occurrence of fraudulent schemes, such as money laundering or terrorist funding, it would be advantageous for the teller to receive an indication of the legitimacy of the transaction (e.g., including if there are any suspicious fraud indictor signals) prior to accepting and depositing the cashier's check.

To provide such knowledge, the code printed on the instrument may also be leveraged by the recipient of the instrument and/or depositing entity to trigger an interaction legitimacy determination, as described with reference to FIGS. 5-8C below. For example, the code may include a public URL to a web application associated with the financial institution such that any device, including a device of the recipient and/or depositing entity, may access the web application based on a reading of the code, where a detected access to the web application may trigger the interaction legitimacy determination. The determination may be based on an evaluation of a plurality of interaction legitimacy factors, including factors associated with an identity authenticity of the individual presenting the instrument, a validity of the instrument, and/or fraud indicator signals. An outcome of the determination (e.g., legitimate, potentially illegitimate, illegitimate) may displayed on the device of the recipient and/or depositing entity through the web application user interface. The outcome may facilitate a decision of the recipient and/or depositing entity to either accept or reject the instrument to mitigate fraud against the recipient and/or the larger entities served by the depositing entity, such as the government.

While specific examples included throughout the present disclosure involve cashier's checks, it should be understood that techniques according to this disclosure may be adapted to other types of instruments. For example, the techniques may be adapted to any instrument for which authentication of the identity of the parties involved, validation of the instrument itself, and/or identification of any other fraud indicators may be useful in determining an overall legitimacy of the interaction to reduce fraud. It should also be understood that the examples above are illustrative only. The techniques and technologies of this disclosure may be adapted to any suitable activity.

FIG. 1 depicts an exemplary environment 100 for monitoring an interaction involving an instrument, according to certain embodiments, and which may be used with the techniques presented herein. An account holder computing device 102, an issuing entity computing device 104, a recipient computing device 106, and/or a depositing entity computing device 108 may be computing devices that communicate with one or more of the other components of the environment 100 across electronic network 110, including one or more server-side systems 112 associated with an account provider (e.g., a financial institution), discussed below. The account holder computing device 102 may be associated with an account holder that has an account with and consumes account services of the account provider, where at least one example account service consumed by the account holder includes instrument generation. The issuing entity computing device 104 may be associated with an entity that issues the instrument, such as the account provider, and is configured to facilitate the generation and printing of the instrument requested by the account holder. The recipient computing device 106 may be associated with a recipient of the instrument. The depositing entity computing device 108 may be a device of an entity associated with the recipient (e.g., a depositing entity), such as a financial institution or other similar institution, that deposits the instrument and/or otherwise renders payment for the instrument presented by the recipient.

The server-side systems 112 may include an account services system 114, a fraud reduction system 116, and/or a data storage system 118, among other systems. In some embodiments, the account services system 114, the fraud reduction system 116, and the data storage system 118 may be associated with a common entity, e.g., the account provider, or the like. In such embodiments, the account services system 114, fraud reduction system 116, and/or data storage system 118 may be part of a cloud service computer system (e.g., in a data center). In other embodiments, one or more of the components of the environment 100 may be associated with a different entity than another. For example, the fraud reduction system 116 may be associated with a third party that provides fraud reduction services to the account provider and/or the data storage system 118 may be associated with a same or different third party that provides data storage services to the account provider. The systems and devices of the environment 100 may communicate in any arrangement. As will be discussed herein, systems and/or devices of the environment 100 may communicate in order to monitor an interaction between the account holder and the recipient involving an instrument, such as a cashier's check, among other activities. The interaction may be monitored from an initiation of the interaction when the account holder requests generation of the instrument to a completion of the interaction when the recipient renders the instrument to the depositing entity for payment.

The network 110 over which the one or more components of the environment 100 communicate may include one or more wired and/or wireless networks, such as a wide area network ("WAN"), a local area network ("LAN"), personal area network ("PAN"), a cellular network (e.g., a 3G network, a 4G network, a 5G network, etc.) or the like. In some embodiments, the network 110 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like. The account holder computing device 102, the issuing entity computing device 104, the recipient computing device 106 and/or the depositing entity computing device 108 and one or more of the server-side systems 112 may be connected via the network 110, using one or more standard communication protocols. The account holder computing device 102, the issuing entity computing device 104, the recipient computing device 106 and/or the depositing entity computing device 108 and one or more of the server-side systems 112 may transmit and receive communications from each other across the network 110, as discussed in more detail below.

The account holder computing device 102, issuing entity computing device 104, recipient computing device 106, and/or depositing entity computing device 108 may be configured to enable access to and/or interaction with other systems in the environment 100 to monitor the interaction to mitigate or reduce fraud. For example, the account holder computing device 102, issuing entity computing device 104, recipient computing device 106, and/or depositing entity computing device 108 may be a computer system such as, for example, a desktop computer, a laptop computer, a tablet, a smart cellular phone (e.g., a mobile phone), a smart watch or other electronic wearable, etc.

In some embodiments, the account holder computing device 102, issuing entity computing device 104, recipient computing device 106, and/or depositing entity computing device 108 may include one or more electronic application(s), e.g., a program, plugin, browser extension, etc., installed on a memory of the respective devices. The electronic application(s) may include one or more of system control software, system monitoring software, software development tools, etc. In some embodiments, the electronic application(s) may be associated with one or more of the other components in the environment 100. For example, one or more of the electronic application(s) may include client applications associated with one or more of the server-side systems 112 (e.g., a client application of the account provider), such as application 120 that is executable on the account holder computing device 102. In some examples, one or more of the client applications may include thick client applications that are locally installed on the respective devices (e.g., desktop applications or mobile applications). In other examples, one or more of the client applications may include thin client applications (e.g., web applications) that are rendered via a web browser launched on the respective devices.

Additionally, one or more components of the account holder computing device 102, issuing entity computing device 104, recipient computing device 106, and/or depositing entity computing device 108 may generate, or may cause to be generated, one or more graphic user interfaces (GUIs) based on instructions/information stored in the memory, instructions/information received from the other systems in the environment 100, and/or the like and may cause the GUIs to be displayed via a display of the respective devices. The GUIs may be, e.g., mobile application interfaces or browser user interfaces and may include text, input text boxes, selection controls, and/or the like. The display may include a touch screen or a display with other input systems (e.g., a mouse, keyboard, etc.) for the users of the respective devices to control the functions thereof.

For example, and as shown in FIG. 1, at least a portion of one or more instructions stored in a memory of the account holder computing device 102 may include instructions for executing the application 120 associated with the account provider (e.g., a client application of the account provider) that is configured to communicate with one or more of the server-side systems 112, including at least account services system 114. As one illustrative example, the application 120 may be executed on the account holder computing device 102 to establish an account session for the account holder via the account services system 114 (e.g., utilizing services provided by the account services system 114). During the account session, the account holder may submit a request via the application 120 to generate an instrument, among other tasks performed during the account session, as described elsewhere herein.

The issuing entity computing device 104 may be associated with a printer 122, a scanning mechanism 124, and a display 126, among other devices. The associated issuing entity computing device 104, printer 122, scanning mechanism 124, and display 126 may be referred to herein generally as a printing system 128. In some embodiments, the issuing entity computing device 104, the printer 122, the scanning mechanism 124, and the display 126 are integrated into a single device (e.g., the printing system 128 is a single device). The single device may be a kiosk, for example. In an exemplary kiosk embodiment, as the account holder walks up to the kiosk, the kiosk may present on the display 126 a first machine-readable code. The account holder may position the account holder computing device 102 to capture the first code (e.g., via camera(s) 121). Responsive to capturing the first code, the account holder computing device 102 may launch the application 120 and prompt the account holder to log into the application 120 by entering his or her username and password to establish the account session. Once logged into the application 120, the application may also prompt the user to complete multi-step authentication by entering additional personal or contact information, such as the user's mobile number and/or address. The account holder may then request the kiosk generate a cashier's check by entering, into the application 120, the account from which to pull the funds for the instrument, the amount, the payee, and/or a memo. A second machine-readable code may then be generated and displayed on a user interface of the application 120. The account holder may hold the account holder computing device 102 up to the scanning mechanism 124 on the kiosk such that the kiosk may capture the second code. Once the kiosk captures the second code and one of the server-side systems 112 is able to perform an authentication using the first code captured by and received from the account holder computing device 102 and the second code captured by and received from the kiosk, the kiosk may be instructed to generate and/or print an image of the instrument. The account holder may retrieve the instrument from the kiosk. The instrument may be printed with a third machine-readable code on the instrument that is generated by the fraud reduction system 116, as described in detail elsewhere herein.

In other embodiments, within the printing system 128, the printer 122, the scanning mechanism 124, and/or the display 126 may be separate devices that are communicatively coupled to the issuing entity computing device 104, where an employee of the issuing entity, such as a teller, may operate the issuing entity computing device 104. In an exemplary teller embodiment, as the account holder walks up to the teller and requests an instrument, the teller may prompt the account holder to provide the account from which to pull the funds for the instrument, the amount, the payee, and/or a memo. The teller may enter this information into the issuing entity computing device 104 and/or the account holder may enter this information into an accessory device (e.g., a pin pad type device) associated with the issuing entity computing device, where the issuing entity computing device 104 transmits this information to one or more of the server-side systems 112 over the network 110 to process the request for the instrument. The issuing entity computing device 104 may receive (and/or generate based on metadata received) from the server-side systems 112 an image of the instrument from and instruct the printer 122 to print the instrument. The teller may retrieve the instrument from the printer 122 and hand the instrument to the account holder. The printed instrument may include a machine-readable code generated by the fraud reduction system 116, as described in detail elsewhere herein.

In yet further embodiments, a printer 129 associated with the account holder (e.g., a home printing device) that is capable of at least printing a code onto a document, such as the instrument, may be communicatively coupled to the account holder computing device 102. In an exemplary home printing embodiment, the account holder may request for generation of a code to be included on a previously existing (e.g., a previously printed) instrument for monitoring purposes via the application 120. As part of the request, the account holder may provide information associated with the existing instrument to identify the instrument. The fraud reduction system 116 may generate and provide at least the code to the application 120. The account holder may place the existing instrument into the printer 129, and the application 120 may instruct the printer 129 to print the code on the instrument. In other examples, the account holder's request via the application 120 may request for generation of the instrument itself. In such examples, the application 120 may receive and/or generate an image of the instrument that includes the code to be printed on the instrument, and instruct the printer 129 to print the instrument with the code.

The recipient computing device 106 may include cameras 130 or another scanning mechanism that enable the recipient computing device 106 to read the code printed on the instrument. Similarly, a scanning mechanism 132 may be communicatively coupled to the depositing entity computing device 108, where the scanning mechanism 132 may be separate from or integrated with the depositing entity computing device 108 to enable the depositing entity computing device 108 to read the code printed on the instrument. In some examples, depending on a type of the depositing entity computing device 108, the scanning mechanism 132 may include one or more or camera(s).

The account services system 114 may include one or more server devices (or other similar computing devices) for executing account services of the account provider. For example, through an account session for the account holder established via the application 120, the account services system 114 may enable the account holder to request to generate an instrument, such as a cashier's check. The account services system 114 and/or another one of the server-side systems 112 may be configured to generate instrument generation data responsive to the request that is provided to the issuing entity computing device 104. The instrument generation data may include metadata for generating an image of the instrument and/or the image of the instrument.

The fraud reduction system 116 may include one or more server devices (or other similar computing devices) for executing fraud reduction services, at least one of the fraud reduction services implemented through generation of a code to be printed on the instrument. In some examples, the fraud reduction system 116 may be a sub-system or component of the account services system 114 (or the one of the server-side systems 112) that generates the instrument generation data responsive to the request. As described in detail elsewhere herein, example fraud prevention services may include processing instrument validations, authenticating instrument validations, storing and updating an entry of the instrument for monitoring purposes, processing instrument invalidations, and determining legitimacy of interactions involving the requested instruments by evaluating a plurality of interaction legitimacy factors.

The data storage system 118 may include a server system, computer-readable memory such as a hard drive, flash drive, disk, etc. In some embodiments, the data storage system 118 includes and/or interacts with an application programming interface for exchanging data to other systems, e.g., one or more of the other components of the environment, such as at least the account services system 114 and the fraud reduction system 116. In some examples, the data storage system 118 may be a sub-system or component of the account services system 114. The data storage system 118 may include a plurality of data stores.

The data stores may include and/or act as a repository or source for various types of data. For example, one data store may include account profile data for account holders, including contact information for the account holders, received from the account services system 114. Another data store may include monitoring-related data for instruments issued by the account provider received from the fraud reduction system 116. The monitoring-related data for a given instrument may be stored in an entry for the instrument. The entry may initially include information associated with the request for the instrument to be generated, and may be updatable based on additional information received from the fraud reduction system 116 (e.g., based on events detected by the fraud reduction system 116). For example, in response to detecting a deposit of the instrument, the entry for the instrument may be updated to include a deposit indication. In some examples, regardless of any events being detected by the fraud reduction system 116, periodic checks may be performed at predetermined intervals using information within the entry to determine if a validity status of the instrument has changed. In other examples, to conserve processing resources, the information within the entry may be evaluated to determine the validity status of the instrument based on the fraud reduction system 116 detecting a specific event, such as a reading of the code.

A structure of the entry may be based on a data storage scheme of the data store. Example data storage schemes may include a database, an immutable ledger, a linked list data structure, and/or the like. For an exemplary database data storage scheme, the entry for the instrument may be a row within a table comprising a plurality of columns representing different data types, where each of the columns and the row form a plurality of cells (e.g., data fields) in which the data associated with instrument are stored. In some circumstances, the database data storage scheme may be a less efficient scheme. For example, within the row, each data field is populated even if there is no corresponding information for that data field (e.g., for fields with no information, the field is still populated with a null value) causing the entry to consume more memory resources than necessary. This inefficiency may be exacerbated when there are large numbers of these instrument-involved interactions being monitored concurrently. For an exemplary immutable ledger, the data for the entry is added to the ledger as a block, where each block links to a previous block by including a cryptographic hash, timestamp, and metadata. Therefore, to update the entry, an additional block may be added to the ledger and linked to the previous block including the data for the entry. For an exemplary linked list data structure, the entry may be comprised of a plurality of nodes at different (e.g., noncontiguous) locations each containing a data field and a reference (e.g., a link) to a next node in the list. A first node may be a head of the linked list that includes the information associated with the request for the generation of the instrument. New information and/or updates to existing information within the entry may be easily inserted as a node anywhere in the middle (e.g., after the head) or at the end of the linked list. Similarly, nodes may be easily deleted (e.g., if update requires deletion of an existing node and addition of a new node). The linked list data structure may be particularly efficient because the structure is deterministic. That is, an amount of time to access a given node is known and is minimal as compared to other structures like an array. The capability to quickly save and access the information using this linked list data structure conserves computing resources, and this conservation is exponential when a number of interactions involving instruments is exorbitant.

Other data store(s) included on the data storage system 118 may include historical behavioral data associated with past interactions involving an instrument issued by the account provider received from the fraud reduction system 116 and/or a list of entities that have not implemented sufficient fraud controls in the past (e.g., flagged entities).

Although depicted as separate components in FIG. 1, it should be understood that a component or portion of a component in the system of exemplary environment 100 may, in some embodiments, be integrated with or incorporated into one or more other components. For example, fraud reduction system 116 and/or data storage system 118 may be integrated with the account services system 114 or the like. As another example, the issuing entity computing device 104, the printer 122, the scanning mechanism 124, and the display may be integrated with a single device or system, such as a kiosk, as discussed above. In some embodiments, operations or aspects of one or more of the components discussed above may be distributed amongst one or more other components. Any suitable arrangement and/or integration of the various systems and devices of the exemplary environment 100 may be used.

In the following disclosure, various acts may be described as performed or executed by a component from FIG. 1, such as the account holder computing device 102, the issuing entity computing device 104, the recipient computing device 106 and/or the depositing entity computing device 108, one or more of the server-side systems 112, or components thereof. However, it should be understood that in various embodiments, various components of the exemplary environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2:
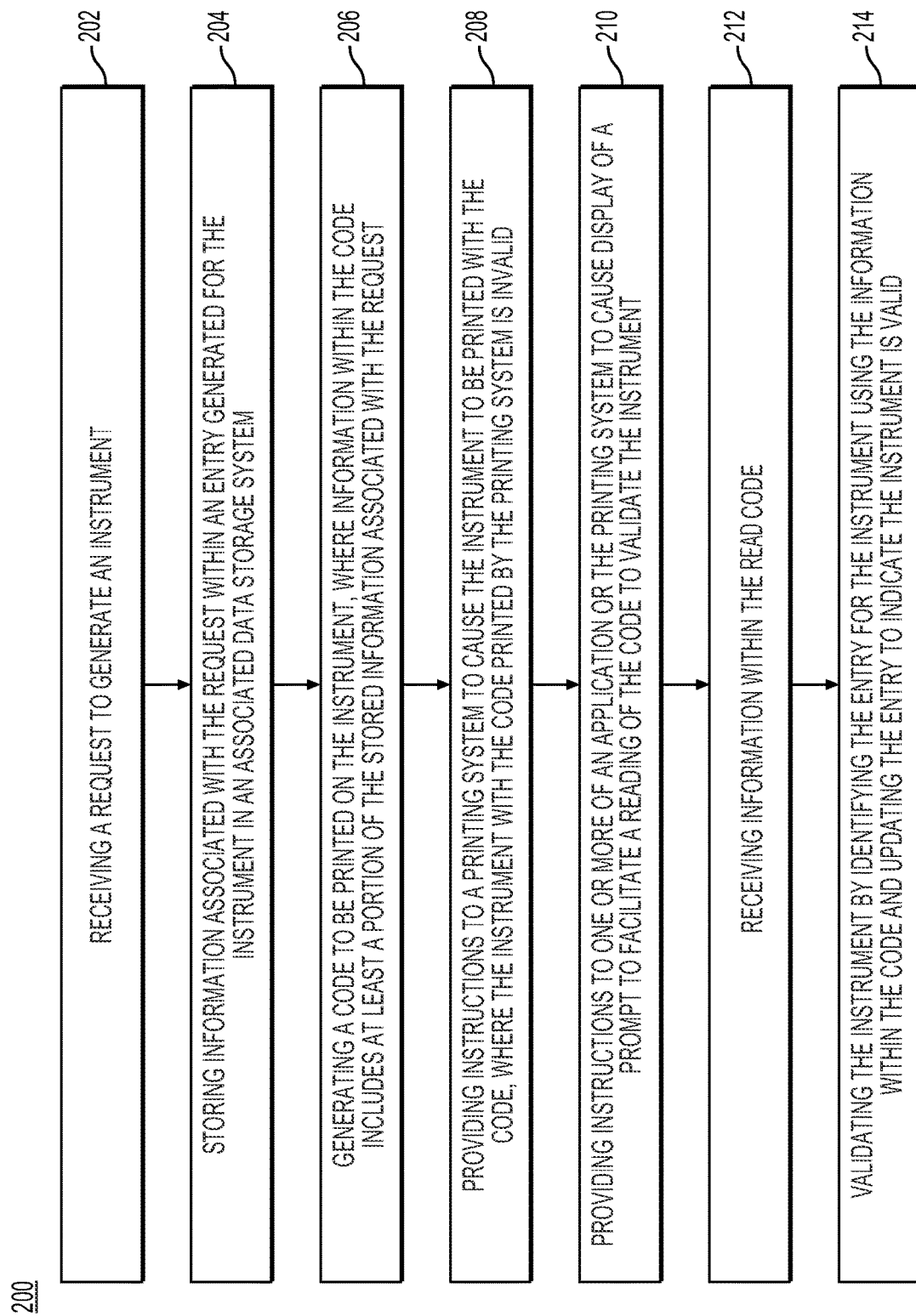
FIG. 2 depicts a flowchart of an exemplary process for validating an instrument, according to certain embodiments.

FIG. 2 depicts a flowchart of an exemplary process 200 for validating an instrument, according to certain embodiments. In some examples, the process 200 may be performed by one or more of the server-side systems 112, such as the account services system 114 and/or the fraud reduction system 116. At step 202, the process 200 may include receiving a request to generate an instrument. For example, a request may be received from the application 120 executing on the account holder computing device 102. In one non-limiting example, the request may be to generate a cashier's check. For purposes of this disclosure, in at least this example where the instrument requested is a cashier's check, the account holder may also be referred to as a drawer of the cashier's check because, although the cashier's check is being issued by the account provider, funds from the account holder's account will ultimately be used to cover an amount of the cashier's check. Thus, the account holder computing device 102 may also be referred to as a computing device of the drawer.

As part of the request, in addition to selecting an account from which the funds for the cashier's check will be drawn, the account holder may input a recipient (e.g., payee) name, an amount for the cashier's check, and/or a memo. As part of the request, the account holder may also input any time-based or geographical restrictions on the validity of the cashier's check. For example, the account holder may input an expiry time from issuance after which the instrument is to no longer be valid and/or a limited geographic boundary in which the instrument is to be considered valid. As discussed in FIGS. 5-8C, the account holder may be prompted to input even further information to facilitate a later determination of transaction legitimacy.

At step 204, the process 200 may include storing information associated with the request within an entry generated for the instrument in an associated data storage system. For example, the fraud reduction system 116 may provide the information to the data storage system 118 for storage in the data store including the monitoring-related data for instruments issued by the account provider, as described in detail with reference to FIG. 1. The information associated with the request may include instrument-specific information. For example, continuing with the cashier's check example, the information may include an issuer (e.g., account provider), a routing number, and an account number, as well as the amount, the recipient, and/or the memo input by the account holder as part of the request. The information associated with the request may also include any restrictions, such as any time-based restrictions and/or geolocation-based restrictions, placed on the instrument by the account holder as part of the request. The information associated with the request may also include temporal information and/or geolocation information associated with the request. The temporal information may include a date and a time the instrument was requested. The geolocation information may include a geographical location of the account holder's computing device and/or a geographical location of the account provider's computing device at the time the instrument was requested. In some embodiments and as described in more detail with reference to FIGS. 5-8C, further information, such as an authentication identifier assigned to the instrument and/or contact information associated with the recipient input as part of the request, may be stored within the entry to facilitate a later determination of a legitimacy of the interaction.

At step 206, the process 200 may include generating a code to be printed on the instrument. The code generated may be a unique code for the instrument that includes private data, public data, or a combination of private and public data. For example, for purposes of leveraging the code to validate the instrument, the information within the code may directly include at least a portion of the stored information associated with the request, such as instrument-specific information, temporal information, and/or geolocation information. In some examples, the portion of the stored information associated with the request may be included within the code as private data (e.g., may be encrypted). In such examples, digital signatures, among types of other cryptographic tools, may be utilized to encrypt or otherwise secure the private data. The fraud reduction system 116 and the application 120 may have access to a key and/or are otherwise capable of (e.g., via a decoding feature) decrypting the data. In some examples, the code itself may be registered and stored in a data store of the data storage system 118, e.g., in association with the instrument within the entry for the instrument. In other examples, the code itself may not be stored, however, a counter associated with the code (e.g., with the digital signature) may be stored.

In some embodiments and as described with reference to FIGS. 5-8C, the code may also include a public URL to a web application associated with the issuing entity (e.g., the account provider) that when accessed, via a reading of the code, displays at least an indication of a legitimacy of the interaction involving the instrument determined by the fraud reduction system 116.

At step 208, the process 200 may include providing instructions to a printing system to cause the instrument to be printed with the code. For example, in kiosk and/or teller embodiments, the fraud reduction system 116 may provide instrument generation data to the issuing entity computing device 104 of the printing system 128. The instrument generation data may include instrument metadata that enables the issuing entity computing device 104 to generate an image of the instrument including the code and/or the instrument generation data may include the image of the instrument with the code itself for printing. The issuing entity computing device 104 may then transmit commands to the printer 122 of the printing system 128 to cause the instrument to be printed with the code. Alternatively, in home printing embodiments, when the account holder is using printer 129 to print the instrument with the code and/or at least print the code on a previously existing instrument, the fraud reduction system 116 may provide at least the portion of the instrument generation data associated with the code to the application 120 executing on the account holder computing device 102. The account holder computing device 102 may then transmit commands to the printer 129 to cause the instrument to be printed with the code and/or at least the code to be printed on the previously existing instrument.

The instrument with the code printed by the printing system is invalid. In other words, the printed instrument is not active or live such that an attempt to deposit or otherwise collect payment on the instrument would not be successful. Accordingly, in kiosk embodiments, if the account holder becomes distracted and forgets to retrieve the instrument from the kiosk, the instrument is dropped and blows away while being retrieved from the kiosk, and/or another individual steals the instrument from the kiosk, among other similar scenarios, the instrument cannot be successfully deposited because it is not valid.

Additionally, by causing the instrument to be invalid when printed, fraud stemming from duplicate or multiple instruments may be reduced because even if two or more instruments for a same interaction are printed, ultimately only one of these invalid instruments can be validated, as described in more detail in the following steps of process 200. For example, in kiosk embodiments, if during the instrument generation process, the account holder pockets an initial instrument printed, indicates that it was not received, and proceeds to reprint the instrument, only one of these printed, invalid instruments can ultimately be validated. Similarly, in teller embodiments, if during the instrument generation process the teller pockets an initial instrument printed and reprints the instrument to hand to the account holder, only the instrument that is validated may be usable, where the validation may be authenticated to ensure the account holder is the one authorizing the validation as discussed below.

Further, when the instrument requested and printed is a cashier's check, even though the cashier's check has been generated and printed, funds of the account holder corresponding to an amount of the cashier's check have not yet been transferred out of their account to a holding account that belongs to the account provider. Because the funds have not yet been transferred and the instrument is invalid (until subsequently read and validated), it is much easier for the instrument to be voided at this point and a new instrument generated due to, e.g., incorrect instrument-specific information printed on the instrument, such as a wrong amount or incorrect name of payee.

At step 210, the process 200 may include providing instructions to one or more of the application or the printing system to cause display of a prompt to facilitate a reading of the code to validate the instrument. For example, in kiosk or teller embodiments, the application 120 and/or the issuing entity computing device 104 may receive the instructions from the fraud reduction system 116 to cause display of the prompt on a user interface of the application 120 and/or on the display 126 of the printing system 128. The prompt may direct or instruct an individual in possession of the instrument printed by the printing system 128 (e.g., via the printer 122) to position the instrument relative to the scanning mechanism 124 of the printing system 128 that can read the code on the instrument. Additionally, the prompt may include a request to confirm correct information is included on the printed instrument prior to the code being read. Further, at least when the instrument is a cashier's check, the prompt may further include a notification indicating the funds corresponding to the amount of the cashier's check will be transferred from the account holder's account upon the reading the code. FIG. 3 below depicts an example of the prompt displayed on a user interface of the application 120. Alternatively, in an exemplary home printing embodiment, the application 120 may receive instructions from the fraud reduction system 116 to cause display of a prompt on the user interface of the application 120 to facilitate a reading of the code by, e.g., cameras 121 of the account holder computing device 102 to validate the instrument.

At step 212, the process 200 may include receiving information within the read code. For example, in the kiosk or teller embodiments, following the reading of the code by the scanning mechanism 124 of the printing system 128, the information within the code may be transmitted via the issuing entity computing device 104 to the fraud reduction system 116 over the network 110. The information within the code may include at least the portion of the information associated with the request that was included within the code as part of the code generation at step 206. In some examples, when the code generated at step 206 includes the private or encrypted portion of the information associated with the request, the information read and received from the printing system 128 may include the encrypted portion of the information associated with the request. This encrypted portion may be decrypted to enable use of the portion of the information associated with the request to identify a corresponding data storage entry for the instrument (e.g., the entry that includes matching information stored therein), as described in more detail with reference to step 214.

Additionally, in the kiosk and/or teller embodiments, subsequent to receiving the information within the code read by the printing system 128, the instrument validation may be authenticated by, for example, authenticating the identity of the individual facilitating and/or authorizing the reading of the code as the account holder. In some embodiments, the authentication may be performed via the application 120. For example, the fraud reduction system 116 may provide a first authenticating identifier for display on the printing system 128 (e.g., via display 126). The first authenticating identifier may be a passcode, a password, a QR code, or any other similar identifier. The fraud reduction system 116 may then provide instructions to the application 120 and/or the printing system 128 to cause display of a prompt for the user to input the first authenticating identifier displayed on the printing system 128 into the application 120 (e.g., enter the passcode or password, scan the QR code, etc.). FIG. 4 below depicts an example of the prompt displayed on a user interface of the application 120. The fraud reduction system 116 may receive a second authenticating identifier input by the user from the application 120 and compare the first authenticating identifier and the second authenticating identifier to determine whether there is a match. If the first and second authenticating identifiers match, the identity of the individual facilitating and/or authorizing the reading of the code is authenticated as the account holder and thus the validation of the instrument is authenticated.

In the home printing embodiment, following the reading of the code by the camera(s) 121 of the account holder computing device 102, the information within the code may be transmitted via the application 120 to the fraud reduction system 116 over the network 110.

At step 214, the process may include validating the instrument by identifying the entry for the instrument using the information within the code and updating the entry to indicate the instrument is valid. For example, the code generated at step 206 may include at least a portion of the information associated with the request that is stored in the entry (e.g., within a data store of data storage system 118) at step 208. Therefore, in the kiosk and teller embodiments, the information within the code read by and received from the printing system 128 may include the portion of the information associated with the request, and this portion may be used to identify a corresponding data storage entry for the instrument (e.g., the entry having information associated with the request stored therein that matches the information within the code). Similarly, in home printing embodiments, the information within the code read by and received from the account holder computing device 102 (e.g., via the application 120) may include the portion of the information associated with the request, and this portion may be used to identify a corresponding data storage entry for the instrument.

Once the entry for the instrument is identified, the entry is updated to indicate the instrument is valid. In other words, the instrument is now active, live, and capable of being deposited or otherwise collected on. Additionally, in examples where the instrument is a cashier's check, the validation may trigger an automatic transfer of funds corresponding to an amount of the cashier's check from an account of the drawer to the holding account of the account provider. For example, the account services system 114 may automatically deduct the amount from the account of the drawer and transfer the amount to the holding account. By holding off on the transfer of the funds until the code is read, the account holder may be able to confirm that the information printed on the cashier's check is correct prior to facilitating the reading of the code (e.g. and may be instructed to do so as part of the prompt described above with reference to step 210). That way, if any information is incorrect, the account holder may simply not facilitate the reading of the code such that the original cashier's check continues to remain invalid, and proceed with requesting a new cashier's check with the correct information for the same interaction. This is a substantial improvement to the current process by which the funds are moved immediately upon generation of the instrument, such that if the information printed on the instrument is incorrect, the customer must undergo the burdensome process of mailing (or otherwise returning) the cashier's check to a processing location of the financial institution that may then take days, weeks, or even months and may require fees to reverse the previous transaction (e.g., to move the amount of the cashier's check from the holding account back to the customer's account). The long waiting period for transaction reversal may have a substantial negative impact on the customer if the particular transaction at hand is time-sensitive. For example, if the cashier's check is for closing costs on a home, the closing date is less than a week away, and there is incorrect information printed on the cashier's check, it is highly unlikely that the transaction can be reversed before the closing date and, without the reversal, the customer may not have sufficient remaining funds in their account to draw an additional cashier's check.

In some embodiments, one or more additional checks or evaluations may be performed as part of the instrument validation process. For example, a first check may be performed based on a time period that has elapsed between the receipt of the request and the reading of the code. This first check may be based on an assumption that the sooner in time these two events occur, the greater the likelihood that the account holder who requested the instrument is the individual who facilitated and/or authorized the reading of the code (e.g., as opposed to another individual who found or stole the instrument and then attempted to validate it). To perform the first check, the fraud reduction system 116 may retrieve the temporal information associated with the request from the entry for comparison to temporal information associated with the reading of the code. For example, in the kiosk and/or teller embodiments, the temporal information associated with the reading of the code may be received from the printing system 128 and include a date and time that the scanning mechanism 124 of the printing system 128 read the code. In the home printing embodiment, the temporal information associated with the reading of the code may be received from the account holder computing device 102 (e.g., via the application 120) and include a date and time that the account holder computing device 102 read the code via the camera(s) 121. As part of the comparison, the fraud reduction system 116 may determine a time period between the request and the reading of the code based on the temporal information associated with the request and the temporal information associated with the reading of the code. If the time period is below or equal to a pre-defined threshold time period, then the instrument may be validated. If the time period is greater than the pre-defined threshold time period, then the instrument may remain invalid.

A second check, particularly in kiosk embodiments, may be performed based on a geographical distance between a location of the account holder computing device 102 at the time of the request and a location of the printing system 128 reading the code. The second check may be based on an assumption that an account holder, and thus the account holder computing device 102, will remain in generally the same geographical area near a location of the printing system 128 from the sending of the request, to the printing of the instrument by the printing system 128, and to the reading of the code by the printing system 128 (e.g., as opposed to a fraudulent user who found or stole the instrument and takes it to a different printing system at a different location and facilitates the reading of the code by the different printing system). To perform the second check, the fraud reduction system 116 may retrieve the geolocation information associated with the request from the data storage entry for comparison with geolocation information associated with the reading of the code (e.g., a location of the printing system 128) that is received from the printing system 128. The fraud reduction system 116 may determine a distance between a location of the request and a location of the reading of the code based on the geolocation information associated with the request and the geolocation information associated with the reading of the code. If the determined distance is below or equal to a pre-defined threshold distance, the instrument may be validated. If the determined distance is above the pre-defined threshold distance, the instrument may remain invalid.

In some examples, if the check remains invalid based on the first time-based check and/or second distance-based check, the fraud reduction system 116 may provide instructions to the application 120 and/or printing system 128 to indicate that there was an error or issue with the validation of the instrument. In some examples, and particularly in the kiosk and/or computing device embodiments, the prompt may further indicate for the user to please call or visit a physical location of the account service provider or if already at the physical location to request assistance from personnel to resolve (e.g., to allow an agent or representative of the account service provider to perform further authentication steps to ensure that the user authorizing validation is in fact the account holder). Additionally or alternatively, the prompt may provide the option for the user to submit a new request for the instrument with a confirmation that the previous instrument generated and printed for which there was an error or issue will remain invalid. The prompt may also include a recommendation to nonetheless shred or otherwise dispose of the previous instrument if a new instrument is being requested.

In some embodiments, subsequent to validating the instrument, the fraud reduction system 116 may receive an invalidation request from the application 120 to invalidate the instrument. For example, the invalidation request may be received in response to the account holder later noticing an error with the information included on the instrument that would make the instrument unacceptable tender to complete the interaction. For example, the account holder may only become aware of the error when presenting the instrument to the recipient and the recipient points out a discrepancy with the payee name or amount. As another example, the invalidation request may be received in response to the account holder dropping, losing, or otherwise misplacing the instrument prior to presenting the instrument to the recipient. As a further example, the instrument may no longer be required (e.g., if the interaction otherwise fell through or was not going to be completed).

Upon receiving the invalidation request, the fraud reduction system 116 may confirm that the instrument has not already been deposited. The fraud reduction system 116 may confirm this by determining whether a deposit indication is present or absent within the data storage entry for the instrument (e.g., because depositing is one example event that causes information within the data storage entry to be updated). If the instrument has not yet been deposited upon receipt of the invalidation request, then the entry for the instrument may be updated to indicate that instrument is no longer valid. The fraud reduction system 116 may provide instructions to the application 120 to cause display of an indication that the invalidation request has been granted and the instrument is no longer valid. The instructions may also include a prompt for the account holder to nonetheless destroy the instrument if it is in their possession. If the instrument is subsequently attempted to be deposited, the deposit will be denied based on the invalidity status of the instrument, as described in more detail with reference to FIGS. 5A-8C below. In some examples, after the invalidation request is received and granted, a new request may be received to generate an instrument for the same transaction, and the process 200 may be performed to validate the instrument.

Alternatively, if the instrument has already been deposited, the invalidation request may be denied. The fraud reduction system 116 may provide instructions to the application 120 to cause display of an indication that the invalidation request has been denied because the instrument has already been deposited. The instructions may also include a prompt for the account holder to call an agent of the account provider to report a potential fraud if the account holder believes the depositing of the instrument was fraudulent.

As described above with reference to process 200, at step 212 information within the code read by the printing system 128 may be received from the printing system 128 (or alternatively, in the home printing embodiment, information within the code may be read and received by the account holder computing device 102 via the application 120). In other embodiments, the code may not be read and thus information within the code is not received. In some examples, the account holder intentionally does not want the code to be read and thus does not facilitate the reading of the code as prompted. This may be due to the account holder identifying an error included in the instrument that requires the account holder to request a new instrument. Alternatively, the account holder may not facilitate the reading of the code as prompted because they do not want to have the funds transferred out of their account at that point in time. In such embodiments, the invalidity of the instrument may be maintained (e.g., the instrument remains inactive or dead and is unavailable for use as tender).

Accordingly, certain embodiments may be performed for validating an instrument. The process 200 described above is provided merely as an example, and may include additional, fewer, different, or differently arranged steps than depicted in FIG. 2.

Figure 3:
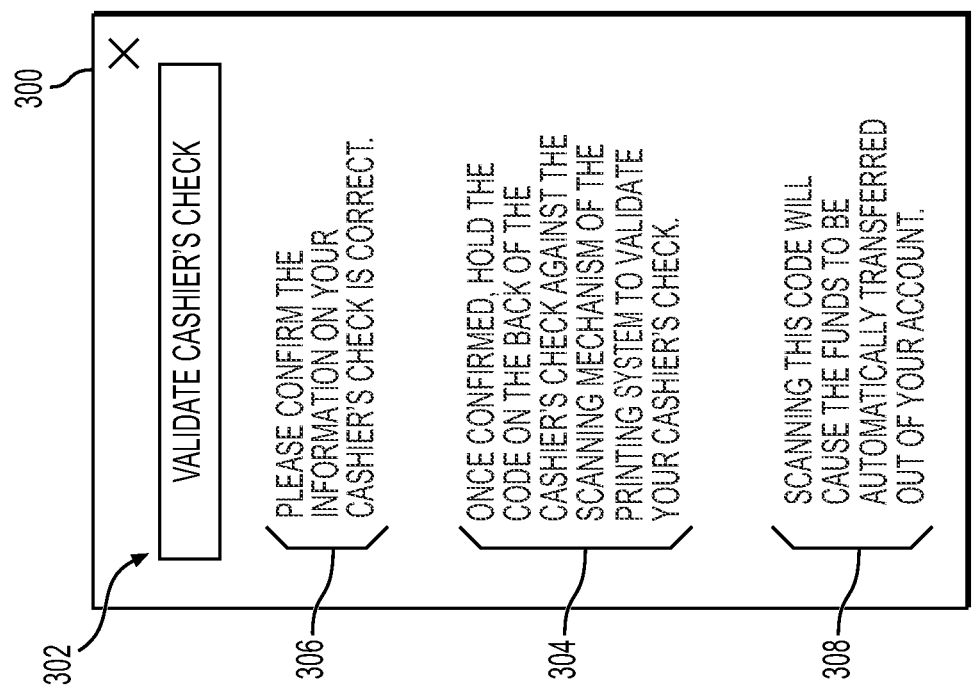
FIG. 3 depicts an exemplary application user interface displaying a prompt to facilitate validation of an instrument, according to certain embodiments.

FIG. 3 depicts an exemplary application user interface 300 displaying a prompt to facilitate validation of an instrument, according to certain embodiments. In some examples, the application user interface 300 may be at least a portion of the user interface of the application 120 executing on the account holder computing device 102.

The application 120 may receive a prompt 302 from the fraud reduction system 116 and display the prompt 302 within the application user interface 300. The prompt 302 may facilitate a reading of the code by, e.g., printing system 128 to validate the instrument. In this non-limiting example, the instrument may be a cashier's check that was printed by the printing system 128.

The prompt 302 may at least include instructions to position the cashier's check relative to the scanning mechanism 124 of the printing system 128 to enable the code on the cashier's check to be read (e.g., instructions 304). Additionally, the prompt 302 may include a request for the account holder to confirm correct information is included on the cashier's check printed by the printing system 128 prior to facilitating the reading the code (e.g., request 306). Additionally or alternatively, the prompt 302 may include a notification indicating the funds corresponding to the amount of the cashier's check will be automatically transferred from the account holder's (e.g., drawer's) account upon the printing system 128 reading the code (e.g., notification 308).

In some examples, the printing system 128 may also receive and display (e.g., via display 126) a prompt to facilitate the reading of the code from the fraud reduction system 116. For example, the prompt may include instructions to use the scanning mechanism 124 of the printing system 128 to read the code on the cashier's check, where requests and notifications similar to those described above for prompt 302 may optionally be included in the prompt. Additionally, in some embodiments, the scanning mechanism 124 (or more generally, the printing system 128) may include or be associated with display lights that may be illuminated in conjunction with the display of the prompt. Indeed, such display lights may assist or guide a user (e.g., the account holder) in performing validation of the instrument. For example, such display lights may illuminate an area adjacent to display 126 so as to draw the user's attention to any instructions displayed via display 126, and/or at an appropriate time, illuminate an area adjacent to scanning mechanism 124 so as to draw the user's attention to the scanning mechanism 124. Additionally, in some arrangements, a display light adjacent an area or slot through which an instrument (e.g., cashier's check) is delivered may be utilized to draw the user's attention to the instrument as it is delivered.

Figure 4:
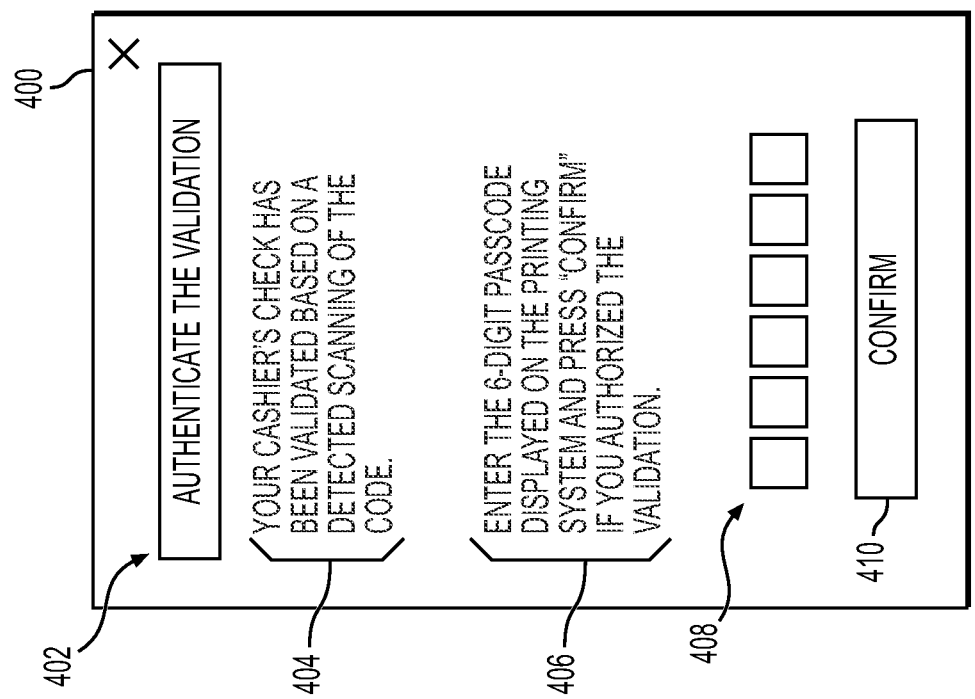
FIG. 4 depicts an exemplary application user interface displaying a prompt to request entry of an identifier displayed on a printing system to authenticate instrument validation, according to certain embodiments.

FIG. 4 depicts an exemplary application user interface 400 displaying a prompt 402 to request entry of an identifier displayed on a printing system to authenticate instrument validation, according to certain embodiments. In some examples, the application user interface 400 may be at least a portion of the user interface of the application 120 executing on the account holder computing device 102.

As discussed above in more detail with reference to FIG. 2, subsequent to the fraud reduction system 116 receiving the information within the code read by the printing system 128, the fraud reduction system 116 may authenticate the validation of the instrument by authenticating that the individual facilitating and/or authorizing the reading of the code is the account holder. As part of the authentication process, the fraud reduction system 116 may provide a first authenticating identifier to the printing system 128 for display (e.g., via display 126). The application 120 may receive instructions from the fraud reduction system 116 to display a prompt 402 for the user to input the first authenticating identifier displayed on the printing system 128. The application 120 may display the prompt 402 in the application user interface 400, as shown in FIG. 4. For example, the application user interface 400 may replace the application user interface 300 described in FIG. 3 after the code is read responsive to the prompt (e.g., prompt 302) displayed therein.

The prompt 402 may include an indication 404 that the instrument has been validated and instructions 406 to enter the first authenticating identifier that is displayed on the display 126 of the printing system 128 into the application (e.g., via input fields 408) and select the confirm control element 410. Responsive to the prompt, the account holder may enter a second authenticating identifier into the input field 408 and select the confirm control element 410. The fraud reduction system 116 may receive the second authenticating identifier from the application 120 and compare it to the first authenticating identifier displayed on the printing system 128 to determine whether the first and second authenticating identifiers match (e.g., are a same identifier). If there is a match, then the instrument validation may be authenticated based on the match indicating that the account holder is the individual that was facilitating and/or authorizing the validation of the code.

The application user interface 400 described above is provided merely as an example, and may include additional, fewer, different, or differently arranged information and/or interactive control elements than depicted in FIG. 4.

FIGS. 2-4 describe example embodiments for validating an instrument via implementation of a code that is generated and printed on the instrument. The following FIGS. 5-8C describe example embodiments for determining a legitimacy of an interaction involving an instrument via implementation of a code that is generated and printed on the instrument. In some examples, a code may be generated and printed on an instrument such that it may enable both validation of the instrument, as described in FIGS. 2-4, and triggering of a legitimacy determination of the interaction involving the instrument, as described in FIGS. 5-8C.

Figure 5:
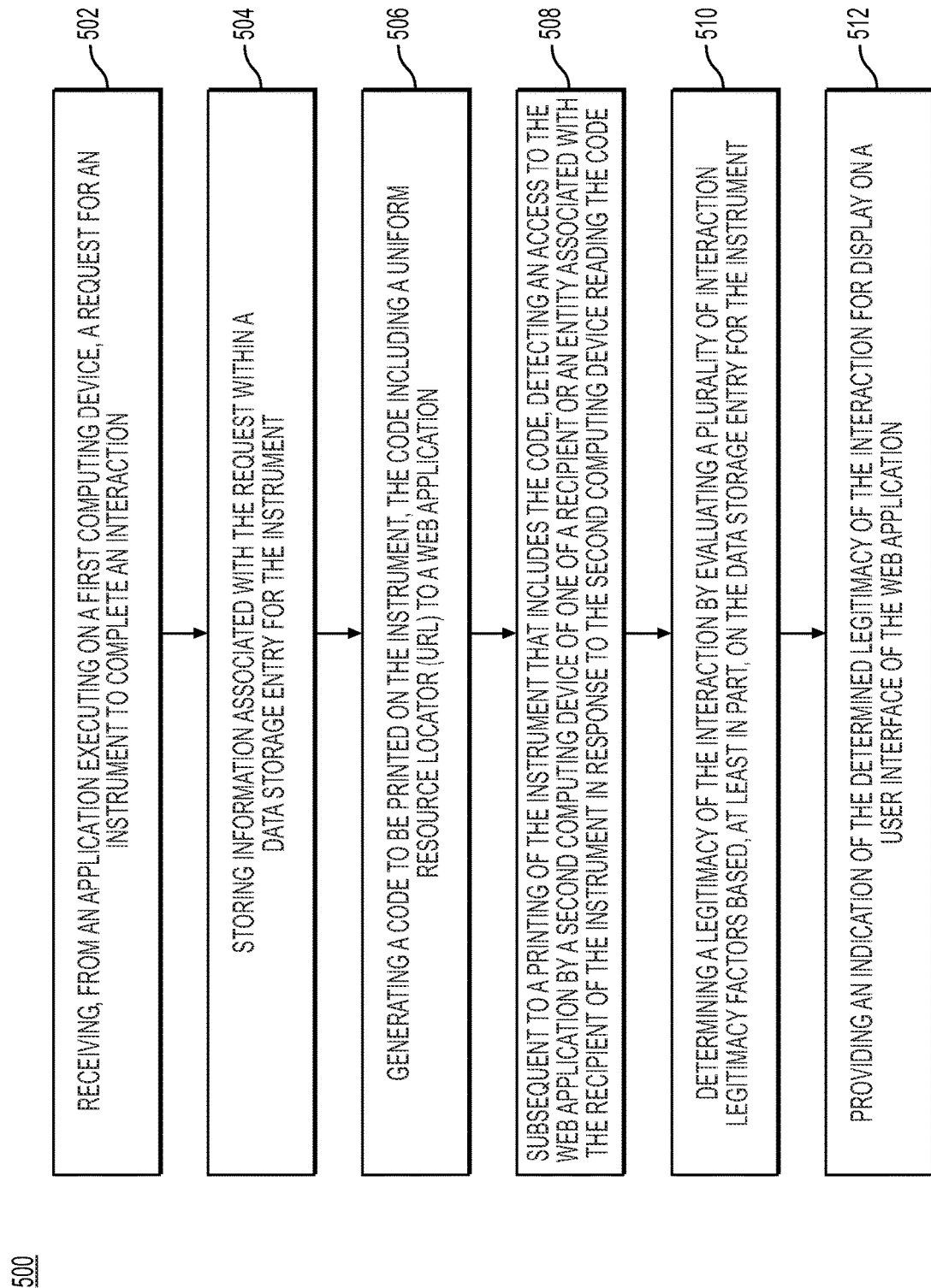
FIG. 5 depicts a flowchart of an exemplary process for determining a legitimacy of an interaction involving an instrument, according to certain embodiments.

FIG. 5 depicts a flowchart of an exemplary process 500 for determining a legitimacy of an interaction, according to certain embodiments. In some examples, the process 500 may be performed by one or more the server-side systems 112, such as the account services system 114 and/or the fraud reduction system 116. At step 502, the process 500 may include receiving a request for an instrument to complete an interaction. The request received may be similar to the request received at step 202 of the process 200 described with reference to FIG. 2. For example, the request may be received from the application 120 executing on a first computing device, such as the account holder computing device 102. In addition to inputting the same or similar information as part of the request described at step 202, at step 502, the account holder may also optionally input an authentication identifier for the instrument, such as a personal identification number (PIN), passcode, or password. Alternatively, the authentication identifier may be automatically assigned by the fraud reduction system 116, discussed below. The account holder may further input contact information associated with the recipient, such a name, telephone number, and/or email address of the recipient (e.g., if the recipient is an individual) or of a person authorized to act on behalf of the recipient that is involved with the depositing of instruments received by that recipient (e.g., if an entity). Additionally, the account holder may indicate a preferred contact method for communications related to the interaction. For example, the preferred contact method may be selected from contact information associated with an account profile of the account holder and/or provided as new information.

At step 504, the process 500 may include storing information associated with the request within a data storage entry for the instrument. The information stored may include the same or similar types of information described as being stored at step 204 of process 200, such as instrument-specific information including any time- or geographic-based restrictions, temporal information, and/or geolocation information. The information stored may also include the additional information described as being input by the account holder as part of the request at step 502, such as the authentication identifier of the instrument, the recipient contact information, and/or the preferred contact information for the account holder.

At step 506, the process 500 may include generating a code to be printed on the instrument. The fraud reduction system 116 may generate the code to include at least a URL to a web application that is associated with the account provider. The URL may be a public URL readable by any computing device used to scan the code. In some embodiments, the code may also be generated to include at least a portion of the stored information associated with the request, as described in detail above with reference to step 206 of the process 200 of FIG. 2. However, this portion of the code may be private such that only the fraud reduction system 116 and the application 120 are able to access the information. Other computing devices that may scan the code may be limited to reading the URL.

At step 508, subsequent to a printing of the instrument that includes the code, the process 500 may include detecting an access to the web application by a second computing device of one of a recipient of the instrument or an entity associated with the recipient (e.g., the recipient computing device 106 or the depositing entity computing device 108) in response to the second computing device reading the code. For example, after the instrument is printed (and optionally validated using methods and systems described with reference to FIGS. 2-4), the account holder may first present the instrument to the recipient and the recipient may then present the instrument to the depositing entity to deposit or otherwise collect payment for the instrument. At either or both presentations, camera(s) or other scanning mechanisms of the second computing device may be used to scan or read the code. When the code is scanned, the second computing device may read the URL causing a notification to be displayed that is selectable to launch the web browser and open the URL. Upon selection of the notification, the web application may be launched in the web browser of the second computing device. The fraud reduction system 116 may detect the access to the web application based on a communication (e.g., an API call) sent from the second computing device to the fraud reduction system 116 via the web application.

At step 510, the process 500 may include determining a legitimacy of the interaction by evaluating a plurality of interaction legitimacy factors based, at least in part, on the data storage entry for the instrument. As one example, the interaction may be determined to be legitimate, determined as having legitimacy concerns (e.g., potentially legitimate or potentially illegitimate), or determined to be illegitimate. The legitimacy factors may be associated with an identity authenticity of an individual presenting the instrument, a validity of the instrument, and/or fraud indicator signals. Certain factors may be weighted more heavily in the determination than other factors. For example, if the instrument is invalid based on an evaluation of one or more factors, the interaction may be determined to be illegitimate regardless if the identity of the individual presenting the instrument is authenticated and no fraud indicator signals are present. As another example, if the identity of the individual presenting the instrument is authenticated and the instrument is valid, but one or more fraud indicator signals are present, the interaction may be determined as having legitimacy concerns and require further verification actions to be performed.

A first subset of the plurality of interaction legitimacy factors may be associated with an identity authenticity of an individual presenting the instrument. In some examples, an interaction legitimacy factor of the first subset includes an authentication of the identity of the individual presenting the instrument based on an authentication identifier assigned to the instrument and provided to the application 120 of the account holder during and/or subsequent to the generation and printing of the instrument. For example, the authentication identifier for the instrument may be a personal identification number (PIN), passcode, password, a QR code, or other similar identifier. In some examples, the authentication identifier is automatically assigned by the fraud reduction system 116. In other examples, the account holder, as part of the request, may include a desired authentication identifier as described above at step 502.

Figure 6:
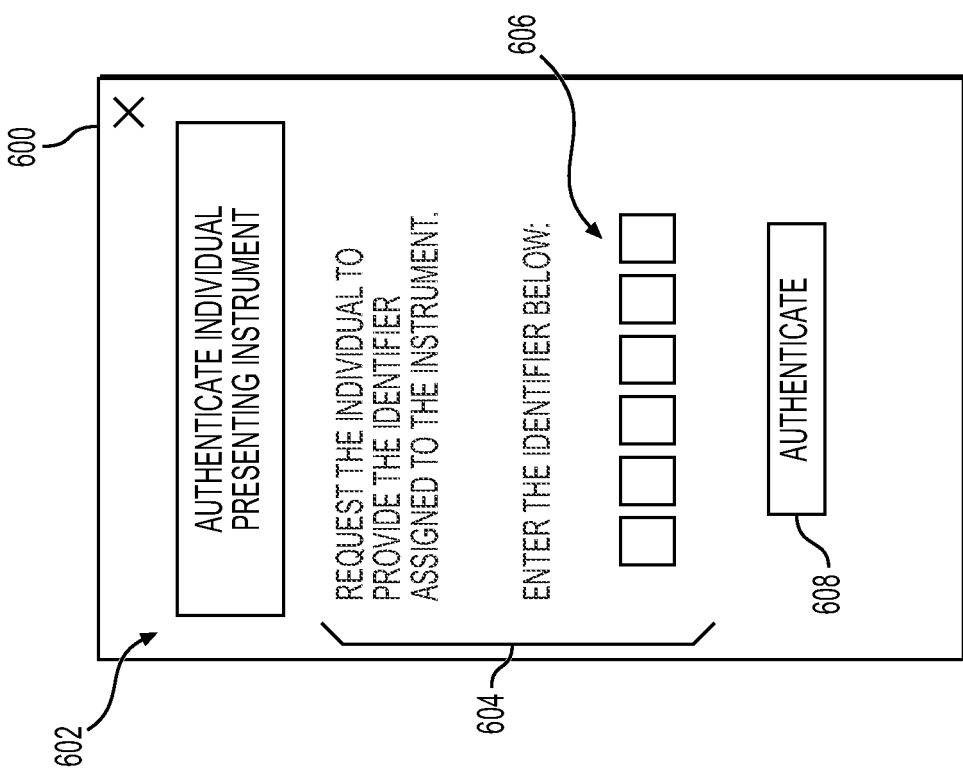
FIG. 6 depicts an exemplary application user interface displaying a prompt to request an authentication identifier assigned to an instrument for authenticating an individual presenting the instrument.

The authentication identifier may be stored by the application 120 to enable subsequent retrieval and use of the authentication identifier to authenticate an identity of the account holder. For example, subsequent to detecting the access to the web application by the second computing device at step 508, the fraud reduction system 116 may provide to the second computing device a prompt for display on the user interface of the web application. The prompt may request the assigned authentication identifier from the individual for input via the second computing device. An exemplary prompt displayed on the web application user interface is shown in FIG. 6 below. In response to receiving input from the second computing device (e.g., via the user interface of the web application), the input received may be compared to the assigned authentication identifier stored within the data storage entry to determine whether there is a match. If there is a match, then the identity of the individual presenting the check may be authenticated.

In instances when the individual is the alleged account holder that is presenting the instrument to the recipient, the individual (if truly the account holder) may simply access the application 120 to retrieve and provide the assigned authentication identifier for input via the second computing device. Further, in other embodiments, when the recipient of the instrument also has an account with the issuing entity (e.g., the account provider) that the funds of the instrument are to be deposited into, the recipient may utilize an application associated with the account provider similar to the application 120 to deposit the instrument rather than having to physically present the instrument to the depositing entity. For example, an image of the instrument including the code may be captured using the camera(s) 130 of the recipient computing device 106 and the prompt may be provided via the application to cause the recipient to enter into the application the assigned identifier provided to them by the account holder.

In instances when the individual is the alleged recipient that is presenting the instrument to the depositing entity, the account holder may provide the recipient with the assigned authentication identifier as they hand over the check to the recipient, and the recipient may document that assigned authentication identifier so that they are able to provide the assigned authentication identifier for entry when depositing the instrument.

Figure 7:
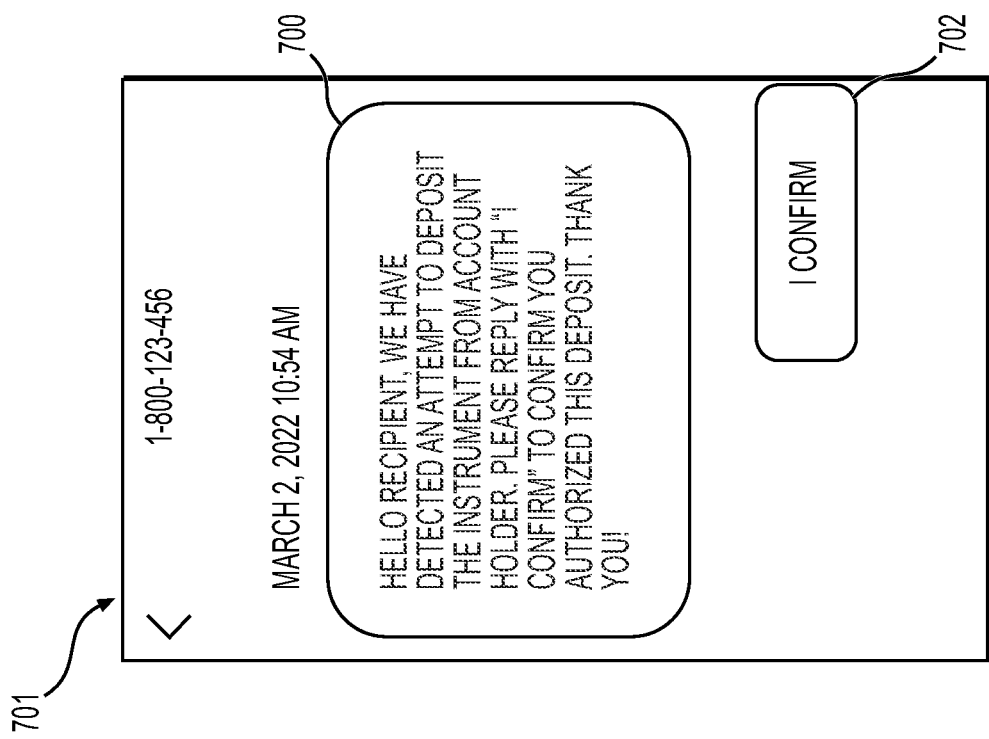
FIG. 7 depicts an exemplary communication transmitted to authenticate an identity of an individual presenting an instrument.

Additionally or alternatively, an interaction legitimacy factor of the first subset may include an authentication of the identity of the individual presenting the instrument based on an interaction with a communication. For example, when an individual alleging to be the account holder is presenting the instrument to the recipient and thus, the second computing device is the recipient computing device 106, an interaction legitimacy factor of the first subset may include an authentication of the identity of the individual presenting the instrument as the account holder based on an interaction with a communication. The communication may be transmitted to the account holder computing device 102 or another device of the account holder using the contact information for the account holder retrieved from their account profile and/or stored within the data storage entry (e.g., if a preferred contact method was specified as part of the request). As another example, when an individual alleging to be the recipient is presenting the instrument to the depositing entity and thus, the second computing device is the depositing entity computing device 108, an interaction legitimacy factor of the first subset may include an authentication of the identity of the individual presenting the instrument as the recipient based on an interaction with a communication. The communication may be transmitted to a device of the recipient using the contact information for the recipient received as part of the request and stored within the data storage entry, as described above at steps 502 and 504. An example communication transmitted to the recipient is shown in FIG. 7, below. Additionally, a communication may be simultaneously transmitted to the account holder to indicate that the instrument is attempting to be deposited by the recipient and prompt a user interaction with the communication that can be used as an additional transaction legitimacy factor. For example, the communication may prompt the user to select a control element to report the interaction as suspicious if the account holder believes this attempt may be fraudulent.

Further, if the identity of the individual is authenticated based on the comparison of the assigned authentication identifier with the input received from the second computing device and/or based on the interaction with the communication, an indication that the identity of the individual has been authenticated may be provided for display on the user interface of the web application.

A second subset of the plurality of interaction legitimacy factors may be associated with a validity of the instrument. Example interaction legitimacy factors within the second subset may include a deposit-based validity status, a time-based validity status, and/or a geolocation-based validity status determined for the instrument relative to a time and/or location associated with the scanning of the code. For example, when the instrument is deposited, the data storage entry for the instrument may be updated (e.g., by the fraud reduction system 116) to include a deposit indication. Accordingly, evaluating a deposit-based validity status of the instrument may include determining whether the instrument has already been deposited based on a presence or absence of the deposit indication in the data storage entry.

As another example, evaluating a time-based validity status of the instrument may include determining the instrument's validity at a time the code is read based on an expiry time stored in the data storage entry. In certain aspects, the expiry time may be a time restriction placed on the instrument by the account holder that is received as part of the information associated with the request and stored in the data storage entry. For example, as part of the request to generate the instrument, the account holder may include a limited time period of 5 days from the date of issuance for depositing the instrument (e.g., to cause the instrument to be invalidated if it is not yet deposited after 5 days). In other aspects, the expiry time may be a restriction placed on the instrument based on a standard or rule followed by, e.g., the issuer of the instrument or the industry. For example, the instrument may be considered stale or out of date, and thus invalidated after 6 months from the date of issuance.

As a further example, evaluating a geolocation-based validity status of the instrument may include determining the instrument's validity at a geographic location of the second computing device when the code is read based on a geographic boundary stored in the data storage entry. In certain aspects, the geographic boundary may be a restriction placed on the instrument by the account holder that is received as part of the information associated with the request and stored in the data storage entry. For example, as part of the request to generate the instrument, the account holder may limit the instrument to being deposited within a same county in which the instrument was generated (e.g., to cause the instrument to be determined invalid if it is attempted to be deposited in a different county). In other aspects, the geographic boundary may be a restriction placed on the instrument based on a standard or rule followed by, e.g., the issuer of the instrument or the industry. For example, the instrument may only be valid for deposit within a same state or country in which the instrument was generated.

A third subset of the plurality of interaction legitimacy factors may be associated with fraud indicator signals. These third subset of factors may be of particular relevance when the second computing device is a depositing entity computing device 108 that is, e.g., being presented the instrument by the recipient for deposit.

One example fraud indicator signal may be based on an evaluation of a historical behavior of the recipient with the depositing entity. The historical behavior data may be stored in a data store of the data storage system 118. In some examples, historical behavior data may be past interactions between the recipient and the depositing entity involving the deposit of instruments issued by the issuing entity (e.g., the account provider). For example, if the recipient has interacted with the depositing entity one or more times in the past (e.g., to deposit instruments issued by the account provider), these past interactions may be evaluated to identify patterns, such as a day of the week or time of day of the past interactions, and determine if the current interaction between the recipient and the depositing entity is following a similar pattern. If the current interaction diverges from the pattern, the divergence may be a potential indicator of fraud.

Another example fraud indicator signal may be based on an evaluation of an identity of the depositing entity associated with the recipient. For example, certain financial institutions that have not taken sufficient steps to control or reduce fraud may be included within a list that is stored, e.g., in a data store of the data storage system 118, and referenced as part of the evaluation. If the depositing entity is a financial institution that is included within the list (e.g., is a flagged entity) or is otherwise a lesser known institution, there may be a greater potential for fraudulent interactions.

A further example fraud indicator signal may be based on an evaluation of a holistic context of the interaction. For example, if the instrument is a cashier's check in the amount of $2.7 million dollars and the recipient is a title company in a city where the base price of property is only $210,0000, the evaluation may flag this interaction as having a high likelihood being fraudulent (e.g., based on the holistic context revealing characteristics of money laundering).

In some embodiments, machine learning systems may be trained and deployed to implement at least a portion of the determination of the legitimacy of the interaction. Particularly, machine learning systems may be trained and deployed with respect to evaluating the third subset of the plurality of interaction legitimacy factors associated with fraud indicator signals.

At step 512, the process 500 may include providing an indication of the determined legitimacy of the interaction for display on a user interface of the web application. For example, the fraud reduction system 116 may provide the indication to the second computing device (e.g., the recipient computing device 106 or the depositing entity computing device 108) via the web application launched on the second computing device. In some examples, in addition to text, the indication may include graphics or animations conveying the determination of whether the interaction is legitimate, there are legitimacy concerns, or the interaction is illegitimate. A level of detail or information included as part of the indication's text may be dependent on a user role or access level associated with a user of the second computing device. For example, a teller operating the depositing entity computing device 108 may receive more information than a landlord operating the recipient computing device 106 that is a recipient of the instrument from a potential tenant.

Additionally, based on the determined legitimacy of the interaction, a prompt may also be provided for display on the user interface of the web application. For example, the prompt may be for the one of the recipient or the depositing entity associated with the recipient to perform a verification action. In some examples, when the interaction is determined to be legitimate and/or is determined to have legitimacy concerns, the verification action may be for the recipient or depositing entity to compare the instrument presented by the individual against instrument-specific information that is obtained from the data storage entry and displayed as part of the prompt. This comparison allows for detection of any post-printing alterations to the instrument being presented. In other examples, and particularly when the interaction is determined to have legitimacy concerns, the verification action may be to call the issuer of the instrument (e.g., the account provider), where the contact information of the issuer may be provided within the prompt. Additionally or alternatively, when the second computing device is a depositing entity computing device 108 and the interaction is determined to have legitimacy concerns, the verification action may be for a teller, for example, operating the depositing entity computing device 108 to seek approval from a higher level manager at the financial institution prior to depositing. Exemplary user interfaces displaying such indications and/or prompts are depicted in FIGS. 8A-8C.

The indication displayed and/or subsequent verification actions performed, if necessary, may facilitate a decision of the recipient and/or depositing entity to either accept or reject the instrument to mitigate fraud.

Accordingly, certain embodiments may be performed for determining a legitimacy of an interaction. The process 500 described above is provided merely as an example, and may include additional, fewer, different, or differently arranged steps than depicted in FIG. 5.

FIG. 6 depicts an exemplary application user interface 600 displaying a prompt 602 to request an authentication identifier assigned to an instrument for authenticating an individual presenting the instrument. In some examples, the application user interface 600 may be at least a portion of the user interface of the web application accessed by the second computing device via a web browser of the second computing device after reading the code. The second computing device may be the recipient computing device 106 and/or the depositing entity computing device 108. For example, when camera(s) or other scanning mechanisms of the second computing device are used scan or read the code, the second computing device may read the URL (e.g., the public URL to the web application included in the code) causing a notification to be displayed that is selectable to launch the web browser and open the URL. Upon selection of the notification, the web application may be launched in the web browser, and the application user interface 600 including the prompt 602 may be displayed therein.

The prompt 602 may include instructions 604 to request that the individual presenting the instrument provide the identifier assigned to the instrument for entry into the application user interface 600 (e.g., via input fields 606). Responsive to the prompt, a user operating the second computing device may request the identifier from the individual, and upon receipt, may input the individual's provided identifier into the input fields 606 and select the authenticate control element 608. Alternatively, the individual may input the identifier themselves via an accessory device (e.g., a pin pad type device) communicatively coupled to the second computing device. The fraud reduction system 116 may receive the input from the second computing device via the web application, and compare the input received to the assigned authentication identifier stored within the data storage entry to determine whether there is a match. If there is a match, then an identity of the individual presenting the instrument is authenticated.

The application user interface 600 described above is provided merely as an example, and may include additional, fewer, different, or differently arranged information and/or interactive control elements than depicted in FIG. 6.

FIG. 7 depicts an exemplary communication 700 transmitted to authenticate an identity of an individual presenting an instrument. As previously discussed, from initiation to completion of an interaction, several presentations of the instrument may occur (e.g., from the account holder to the recipient and from the recipient to the depositing entity). FIG. 7 depicts an example identity authentication process performed when an individual alleging to be the recipient of the instrument, or at least an individual authorized to act on behalf of the recipient, presents the instrument to a depositing entity associated with the recipient to deposit the instrument or otherwise collect tender.

As part of the identity authentication process, a communication, such as communication 700, may be generated and transmitted using contact information for the recipient that is received as part of the information associated with the request (e.g., that is input by the account holder as part of the request via the application 120) and stored within the data storage entry for the instrument. As illustrated, the communication 700 may be a text message that is transmitted to a mobile telephone number for, e.g., the recipient computing device 106, that was provided by the account holder as part of the request process. The recipient computing device 106, may then display the communication 700 to the recipient on a screen 701 of the recipient computing device 106. In other examples, the communication 700 may be an electronic mail communication, an instant message, a push notification, a phone call, or other similar communication.

The communication 700 may include a prompt for user interaction. For example, as shown in FIG. 7, the communication 700 may indicate that an attempt to the deposit the instrument has been detected, and the recipient may be prompted to reply to the communication 700 using a particular phrase to confirm that they authorized this deposit. If the individual presenting the instrument for deposit is the true recipient or authorized to deposit on behalf of the true recipient as alleged, the recipient being aware of the deposit may interact with the communication 700 by sending a reply communication 702 (e.g., a reply text message) with the phrase as prompted. The fraud prevention system may receive the reply communication 702, and determine the reply communication 702 to be a user interaction with the communication 700 indicating the identity of the individual (e.g., as the recipient) is authentic.

The communication 700 described above is provided merely as an example, and may include additional, fewer, different, or differently arranged information and/or interactive control elements than depicted in FIG. 7.

Additionally, while FIG. 7 depicts an example identity authentication process performed during the presentation of the instrument by an individual alleging to be the recipient to the depositing entity, a similar communication to the communication 700 may be transmitted to the account holder during the presentation of the instrument by an individual alleging to be the account holder to the recipient. A user interaction with the communication may then similarly be used to authenticate the individual as the account holder.

FIGS. 8A-8C depict exemplary application user interfaces displaying an indication of a determined legitimacy of an interaction. In some examples, the application interfaces 800A, 800B, 800C may be at least a portion of the user interface of the web application accessed by the second computing device via a web browser of the second computing device after reading the code. The second computing device may be the recipient computing device 106 and/or the depositing entity computing device 108. For example, when camera(s) or other scanning mechanisms of the second computing device are used scan or read the code, the second computing device may read the URL (e.g., the public URL to the web application included in the code) causing a notification to be displayed that is selectable to launch the web browser and open the URL. Upon selection of the notification, the web application may be launched in the web browser, and dependent on the determined legitimacy of the interaction by the fraud prevention system, one of application user interfaces 800A, 800B, 800C that include an indication of the determined legitimacy of the interaction may be displayed therein. In other examples, one of application user interfaces 800A, 800B, 800C may be displayed following an identity authentication process performed via another user interface of the web application that is displayed upon the launch of the web application in the browser (e.g., the one of application user interfaces 800A, 800B, 800C replaces the other user interface). For example, the other user interface may be the application user interface 600 with the prompt 602 to request an authentication identifier assigned to an instrument for authenticating an individual presenting the instrument, as described with reference to FIG. 6.

Application user interface 800A is an example user interface that is displayed in response to a determination that the interaction is legitimate. For example, application user interface 800A may include an indication 802 that the interaction is legitimate. The indication 802 may include graphics or animation in addition or alternatively to text to convey the determined legitimacy. In some examples, additional details regarding the determination may be included as part of the indication. For example, the details may confirm a status of each of the three subsets of interaction legitimacy factors analyzed that led to the determination, such as identity authenticity of the individual presenting the instrument, validity of the instrument, and no fraud indicator signals identified. The application user interface 800A may also include a prompt 804 to compare the information on the instrument that was presented to instrument-specific information 806 stored for the instrument in the data storage entry (e.g., to confirm that the information corresponds and the instrument has not been altered post-printing). As one example, when the instrument is a cashier's check, the instrument-specific information may include an issuer, a routing number, an account number, an amount, a recipient, and/or or a memo. The instrument-specific information 806 may be displayed as part of the prompt 804 to enable the comparison against the instrument presented by the individual.

Application user interface 800B is an example user interface displayed in response to a determination that the interaction is illegitimate. For example, application user interface 800B may include an indication 810 that the interaction is illegitimate. The indication 810 may include graphics or animation in addition or alternatively to text to convey the determined illegitimacy. In some examples, additional details regarding the illegitimacy determination may be included as part of the indication. For example, the details may more specifically indicate that the interaction is illegitimate because the instrument has already been deposited and invalid.

Application user interface 800C is an example user interface displayed in response to a determination that the interaction is potentially illegitimate. For example, application user interface 800C may include an indication 820 that the interaction is potentially illegitimate. The indication 810 may include graphics or animation in addition or alternatively to text to convey the determined potential illegitimacy. In some examples, the application user interface 800C may include a prompt to perform a verification action (e.g., prompt 822). The verification action may be performed to further verify details of the interaction to increase a confidence that the interaction is legitimate prior to accepting the instrument or alternatively to determine that the interaction is indeed illegitimate prior to declining the instrument. As depicted in FIG. 8C, one example verification action is to call the issuer (e.g., the account provider that issued the instrument).

The application user interfaces 800A, 800B, and 800C described above are provided merely as examples, and may include additional, fewer, different, or differently arranged information and/or interactive control elements than depicted in FIGS. 8A-8C.

In general, any process or operation discussed in this disclosure that is understood to be computer-implementable, such as the processes or operations depicted in FIGS. 2-8C, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 9:
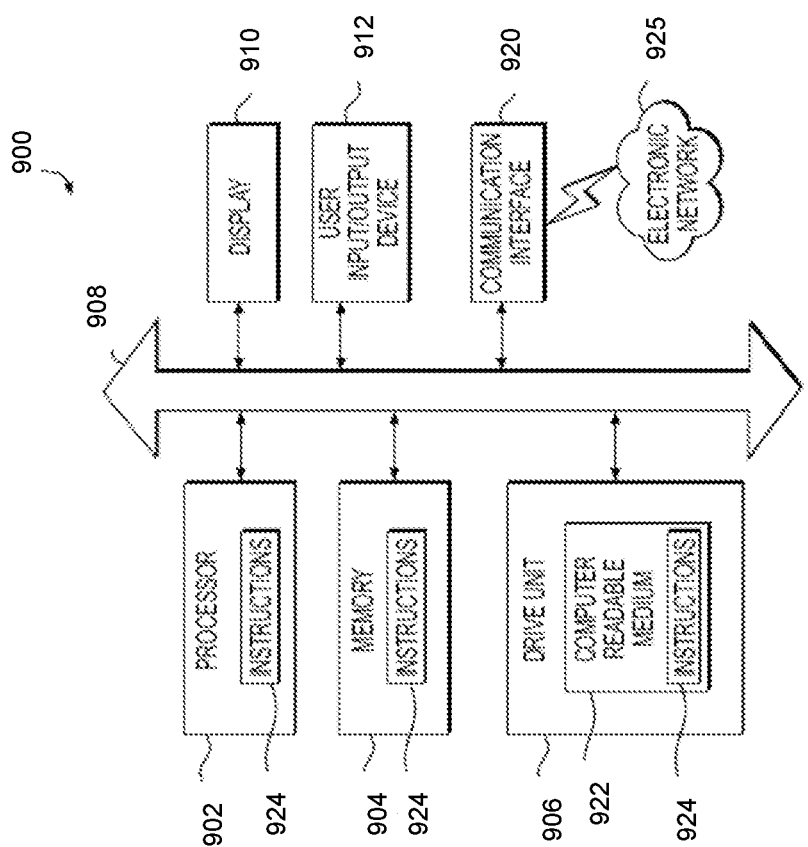
FIG. 9 depicts an example of a computer, according to certain embodiments.

FIG. 9 depicts an example of a computer 900, according to certain embodiments. FIG. 9 is a simplified functional block diagram of a computer 900 that may be configured as a device for executing processes or operations depicted in, or described with respect to, FIGS. 2-8C, according to exemplary embodiments of the present disclosure. For example, the computer 900 may be configured as one of the account holder computing device 102, the issuing entity computing device 104, the recipient computing device 106, the depositing entity computing device 108, one of the server-side systems 112, and/or another device according to exemplary embodiments of this disclosure. In various embodiments, any of the systems herein may be a computer 900 including, e.g., a data communication interface 920 for packet data communication. The computer 900 may communicate with one or more other computers 900 using the electronic network 925. The electronic network 925 may include a wired or wireless network similar to the network 110 depicted in FIG. 1.

The computer 900 also may include a central processing unit ("CPU"), in the form of one or more processors 902, for executing program instructions 924. The program instructions 924 may include instructions for running the application 120 (e.g., if the computer 900 is the account holder computing device 102). The program instructions 924 may include instructions for running one or more operations of the respective server-side systems 112 (e.g., if the computer 900 is one of the respective server-side systems 112). The computer 900 may include an internal communication bus 908, and a drive unit 906 (such as read-only memory (ROM), hard disk drive (HDD), solid-state disk drive (SDD), etc.) that may store data on a computer readable medium 922, although the computer 900 may receive programming and data via network communications. The computer 900 may also have a memory 904 (such as random access memory (RAM)) storing instructions 924 for executing techniques presented herein, although the instructions 924 may be stored temporarily or permanently within other modules of computer 900 (e.g., processor 902 and/or computer readable medium 922). The computer 900 also may include user input and output ports 912 and/or a display 910 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method, comprising:
receiving, from a first computing device of an account holder, a request for an instrument to complete an interaction;
storing information associated with the request within a data storage entry for the instrument, wherein the stored information includes instrument-specific information provided as part of the request, the instrument-specific information including an amount and a recipient associated with the interaction;
encrypting the instrument-specific information;
generating a bar code to be printed on the instrument, the bar code generated to include a uniform resource locator (URL) to a web application and the encrypted instrument-specific information;
providing instructions that include the bar code to a printing system to cause the printing system to print the instrument with the bar code, wherein the instrument printed with the bar code is initially invalid;
providing instructions to one or more of the first computing device of the account holder or the printing system to cause display of a prompt on a display of one or more of the first computing device or the printing system, respectively, the displayed prompt instructing the account holder to facilitate a reading, by the printing system, of the bar code on the instrument printed by the printing system to validate the instrument;
in response to receiving an indication of the reading of the bar code by the printing system, changing a status of the instrument from invalid to valid to validate the instrument, wherein the valid status is stored in the data storage entry for the instrument, and subsequent to the instrument being printed with the bar code and validated, a scanning device associated with a second computing device of one of a recipient or an entity associated with the recipient of the instrument reads the bar code, including the encrypted instrument-specific information included in the bar code, causing the web application to be accessed by the second computing device via the URL; and
in response to receiving, from the web application, an indication of the access to the web application and the encrypted instrument-specific information:
decrypting the encrypted instrument-specific information;
identifying the data storage entry for the instrument using the instrument-specific information;
determining a legitimacy of the interaction by evaluating a plurality of interaction legitimacy factors based, at least in part, on data stored in the data storage entry for the instrument, wherein at least a first subset of the plurality of interaction legitimacy factors is associated with an identity authenticity of an individual presenting the instrument to the one of the recipient or the entity associated with the recipient, and at least a second subset of the plurality of interaction legitimacy factors is associated with a validity of the instrument; and
providing an indication of the determined legitimacy of the interaction for display on a user interface of the web application.

2. The computer-implemented method of claim 1, further comprising:
assigning an authentication identifier to the instrument;
storing the assigned authentication identifier within the data storage entry for the instrument; and
providing the assigned authentication identifier to the first computing device.

3. The computer-implemented method of claim 2, wherein an interaction legitimacy factor of the first subset includes an authentication of the identity of the individual based on the assigned authentication identifier, and evaluating the interaction legitimacy factor comprises:
providing, for display on the user interface of the web application, a prompt to request the assigned authentication identifier from the individual for input via the second computing device;
receiving an input from the second computing device; and
comparing the input received to the assigned authentication identifier stored within the data storage entry to determine whether there is a match.

4. The computer-implemented method of claim 1, wherein:
the information associated with the request and stored within the data storage entry includes contact information associated with the account holder and the recipient,
when the second computing device is a computing device of the recipient, an interaction legitimacy factor of the first subset includes an authentication of the identity of the individual presenting the instrument as the account holder based on an interaction with a communication that is transmitted to the first computing device or another device of the account holder using the contact information stored within the data storage entry; and
when the second computing device is a computing device of the entity associated with the recipient, an interaction legitimacy factor of the first subset includes an authentication of the identity of the individual presenting the instrument as the recipient based on an interaction with a communication that is transmitted to a device of the recipient using the contact information stored within the data storage entry.

5. The computer-implemented method of claim 4, wherein if the identity of the individual is authenticated based on the interaction with the communication, the method further comprises:
providing an indication that the identity of the individual has been authenticated for display on the user interface of the web application.

6. The computer-implemented method of claim 1, wherein when the instrument is deposited, the data storage entry for the instrument is updated to include a deposit indication, and evaluating an interaction legitimacy factor of the second subset comprises determining whether the instrument has already been deposited based on a presence or absence of the deposit indication in the data storage entry.

7. The computer-implemented method of claim 1, wherein the information associated with the request and stored within the data storage entry further includes an expiry time for depositing the instrument, and evaluating an interaction legitimacy factor of the second subset comprises:
receiving, from the web application, a time the bar code is read by the scanning device; and
determining the instrument's validity at the time the bar code is read based on the expiry time stored in the data storage entry.

8. The computer-implemented method of claim 1, wherein the information associated with the request and stored within the data storage entry further includes a geographic boundary for depositing the instrument, and evaluating an interaction legitimacy factor of the second subset comprises:
receiving, from the web application, a geographic location of the second computing device when the bar code is read by the scanning device; and
determining the instrument's validity at the geographic location based on the geographic boundary stored in the data storage entry.

9. The computer-implemented method of claim 1, wherein the entity associated with the recipient is a financial institution and, when at least the second computing device is a computing device of the financial institution, the plurality of interaction legitimacy factors further include a third subset associated with fraud indicator signals.

10. The computer-implemented method of claim 9, wherein the fraud indicator signals are based on an evaluation of one or more of:
historical behavior of the recipient with the financial institution;
an identity of the financial institution; or
a holistic context of the interaction.

11. The computer-implemented method of claim 1, further comprising:
based on the determined legitimacy of the interaction, providing for display on the user interface of the web application a prompt for the one of the recipient or the entity associated with the recipient to perform a verification action.

12. The computer-implemented method of claim 1, wherein a level of detail provided as part of the indication of the determined legitimacy of the interaction is based on an access level associated with the one of the recipient or the entity associated with the recipient.

13. The computer-implemented method of claim 1, wherein the instrument-specific information further includes one or more of an issuer, a routing number, or an account number, and at least a portion of the instrument-specific information is further provided for display on the user interface of the web application to prompt comparison against the instrument presented by the individual.

14. A system, comprising:
at least one memory storing instructions; and
at least one processor operatively connected to the at least one memory and configured to execute the instructions to perform operations, including:
receiving, from a first computing device of an account holder, a request for an instrument to complete an interaction, the request including instrument-specific information comprising an amount and a recipient associated with the interaction;
storing information associated with the request, including the instrument-specific information, within a data storage entry for the instrument;
encrypting the instrument-specific information;
generating a bar code to be printed on the instrument, the bar code including a uniform resource locator (URL) to a web application and the encrypted instrument-specific information;
providing instructions that include the bar code to a printing system to cause the printing system to print the instrument with the bar code, wherein the instrument printed with the bar code is initially invalid;
providing instructions to one or more of the first computing device of the account holder or the printing system to cause display of a prompt on a display of one or more of the first computing device or the printing system, respectively, the displayed prompt instructing the account holder to facilitate a reading, by the printing system, of the bar code on the instrument printed by the printing system to validate the instrument;
in response to receiving an indication of the reading of the bar code by the printing system, changing a status of the instrument from invalid to valid to validate the instrument, wherein the valid status is stored in the data storage entry for the instrument, and subsequent to the instrument being printed with the bar code and validated, a scanning device associated with a second computing device of one of a recipient or a financial institution depositing the instrument for the recipient reads the bar code, including the encrypted instrument-specific information, causing the web application to be accessed by the second computing device via the URL; and
in response to receiving, from the web application, an indication of the access to the web application and the encrypted instrument-specific information:
decrypting the encrypted instrument-specific information;
identifying the data storage entry for the instrument using the instrument-specific information;
determining a legitimacy of the interaction by evaluating a plurality of interaction legitimacy factors based, at least in part, on data stored in the data storage entry for the instrument, wherein at least a first subset of the plurality of interaction legitimacy factors is associated with an identity authenticity of an individual presenting the instrument to the one of the recipient or the financial institution, and at least a second subset of the plurality of interaction legitimacy factors is associated with a validity of the instrument; and
providing an indication of the determined legitimacy of the interaction for display on a user interface of the web application.

15. The system of claim 14, wherein an interaction legitimacy factor of the first subset includes an authentication of the identity of the individual presenting the instrument to the one of the recipient or the financial institution as one of the account holder or the recipient, respectively, based on at least one of:
receipt, from the second computing device, of input matching an authentication identifier assigned to the instrument, provided to the first computing device, and stored within the data storage entry; or
an interaction with a communication that is transmitted using contact information associated with the account holder or the recipient that is stored, as part of the information associated with the request, within the data storage entry.

16. The system of claim 14, wherein evaluating an interaction legitimacy factor of the second subset comprises at least one of:
determining the instrument's validity based on a presence or absence of a deposit indication stored in the data storage entry;
determining the instrument's validity at a time the bar code is read based on an expiry time stored in the data storage entry as part of the information associated with the request; or
determining the instrument's validity at a geographic location of the second computing device when the bar code is read based on an geographic boundary stored in the data storage entry as part of the information associated with the request.

17. The system of claim 14, wherein, when at least the second computing device is a computing device of the financial institution, the plurality of interaction legitimacy factors further include a third subset associated with fraud indicator signals.

18. A computer-implemented method, comprising:
receiving, from a first computing device of an account holder, a request for an instrument to complete an interaction, the request including instrument-specific information and an authentication identifier generated by the account holder, the instrument-specific information including an amount and a recipient associated with the interaction;
assigning the authentication identifier to the instrument;
storing information associated with the request, including the assigned authentication identifier, within a data storage entry for the instrument;
encrypting the instrument-specific information;
generating a bar code to be printed on the instrument, the bar code including a uniform resource locator (URL) to a web application and the encrypted instrument-specific information;
providing instructions that include the bar code to a printing system to cause the printing system to print the instrument with the bar code, wherein the instrument printed with the bar code is initially invalid;
providing instructions to one or more of the first computing device of the account holder or the printing system to cause display of a prompt on a display of one or more of the first computing device or the printing system, respectively, the displayed prompt instructing the account holder to facilitate a reading, by the printing system, of the bar code on the instrument printed by the printing system to validate the instrument;
in response to receiving an indication of the reading of the bar code by the printing system, changing a status of the instrument from invalid to valid to validate the instrument, wherein the valid status is stored in the data storage entry for the instrument, and subsequent to the instrument being printed with the bar code and validated, a scanning device associated with a second computing device of one of a recipient or an entity associated with the recipient of the instrument reads the bar code, including the encrypted instrument-specific information, causing the web application to be accessed by the second computing device via the URL; and
in response to receiving, from the web application, an indication of the access to the web application, the encrypted instrument-specific information, and a time the bar code was read by the scanning device:
decrypting the encrypted instrument-specific information;
identifying the data storage entry for the instrument using the instrument-specific information;
providing, for display on a user interface of the web application, a prompt to request the assigned authentication identifier for input via the second computing device;
receiving an input from the second computing device responsive to the prompt;
determining a legitimacy of the interaction by evaluating a plurality of interaction legitimacy factors based, at least in part, on data stored in the identified data storage entry for the instrument, wherein at least a first subset of the plurality of interaction legitimacy factors is associated with an identity authenticity of an individual presenting the instrument, the identity authenticity based, at least in part, on a comparison of the assigned authentication identifier stored in the data storage entry for the instrument and the input received from the second computing device, and wherein at least a second subset of the plurality of interaction legitimacy factors is associated with a validity of the instrument, the validity based, at least in part, on the time the bar code was read; and
providing an indication of the determined legitimacy of the interaction for display on a user interface of the web application.

19. The computer-implemented method of claim 1, wherein
changing the status of the instrument from invalid to valid comprises:
receiving, from the printing system, the encrypted instrument-specific information included in the bar code read by the printing system;
decrypting the encrypted instrument-specific information;
identifying the data storage entry for the instrument using the instrument-specific information; and
updating the data storage entry to store the valid status to indicate the instrument is valid.

20. The computer-implemented method of claim 1, wherein, when the instrument printed with the bar code is initially invalid, the instrument is associated with the interaction based on the encrypted instrument-specific information included in the bar code, and is unavailable for use as tender until the status of the instrument is changed from invalid to valid in response to receiving the indication of the reading of the bar code by the printing system.

* * * * *